June 11, 1957  J. D. ROSSIER  2,795,027
MACHINE FOR MAKING CLAY PIPE OR THE LIKE
Original Filed Aug. 20, 1951  12 Sheets-Sheet 1
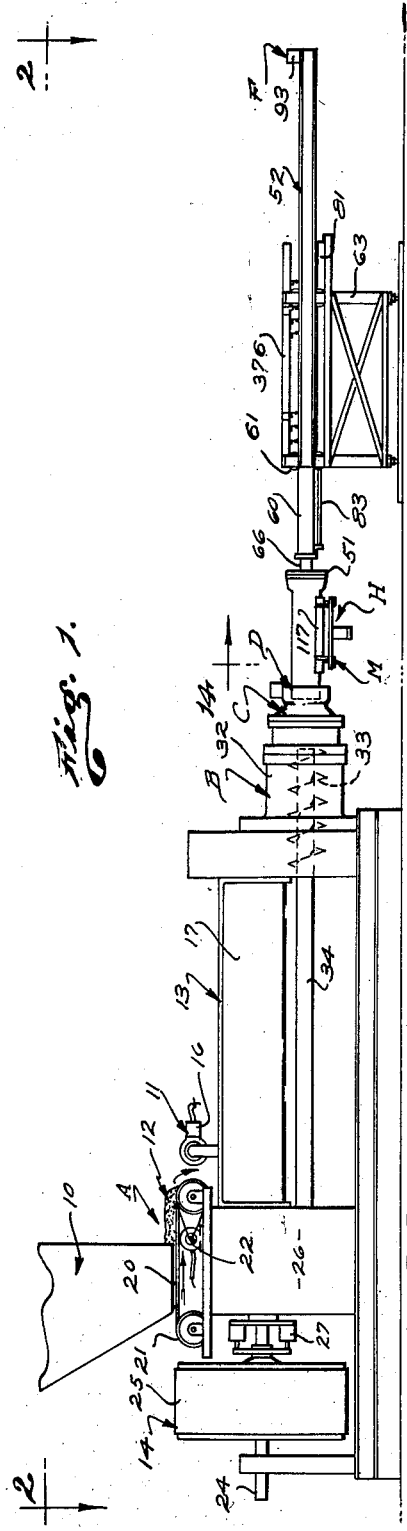
INVENTOR.
John D. Rossier
BY
Attorney

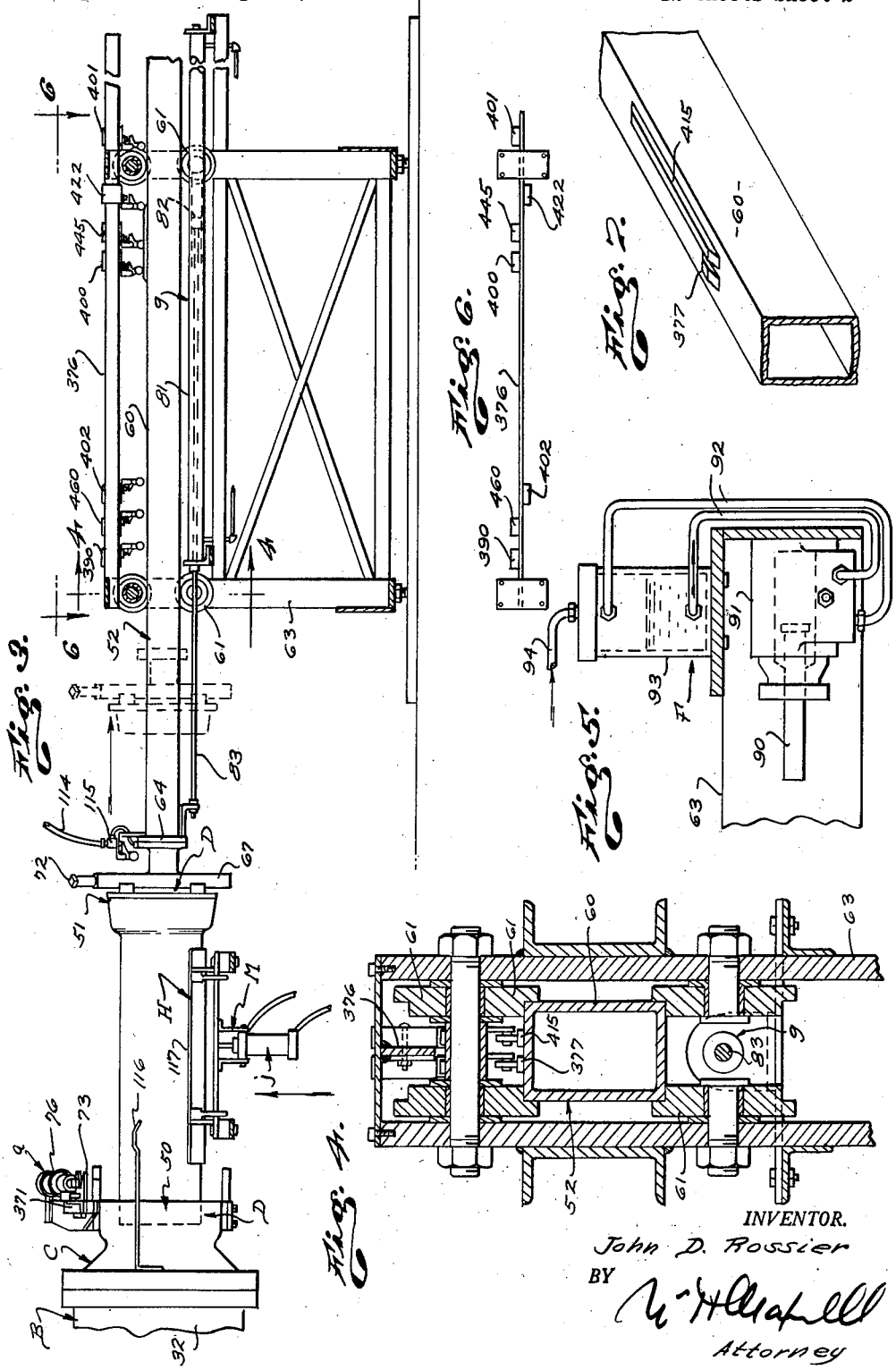

June 11, 1957  J. D. ROSSIER  2,795,027
MACHINE FOR MAKING CLAY PIPE OR THE LIKE
Original Filed Aug. 20, 1951  12 Sheets-Sheet 3
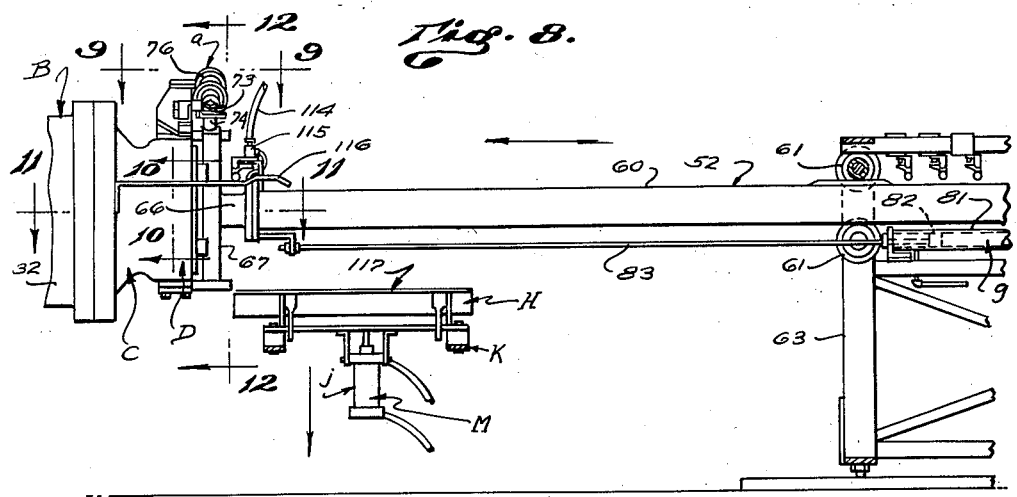
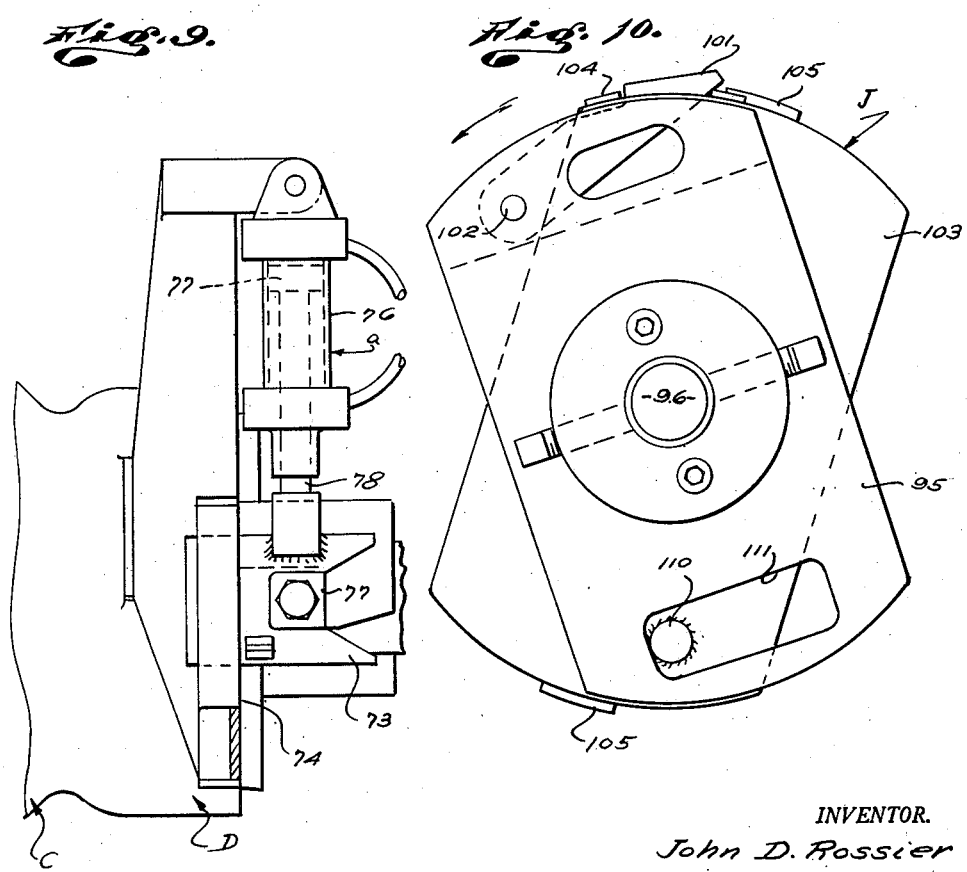
INVENTOR.
John D. Rossier
BY
Attorney

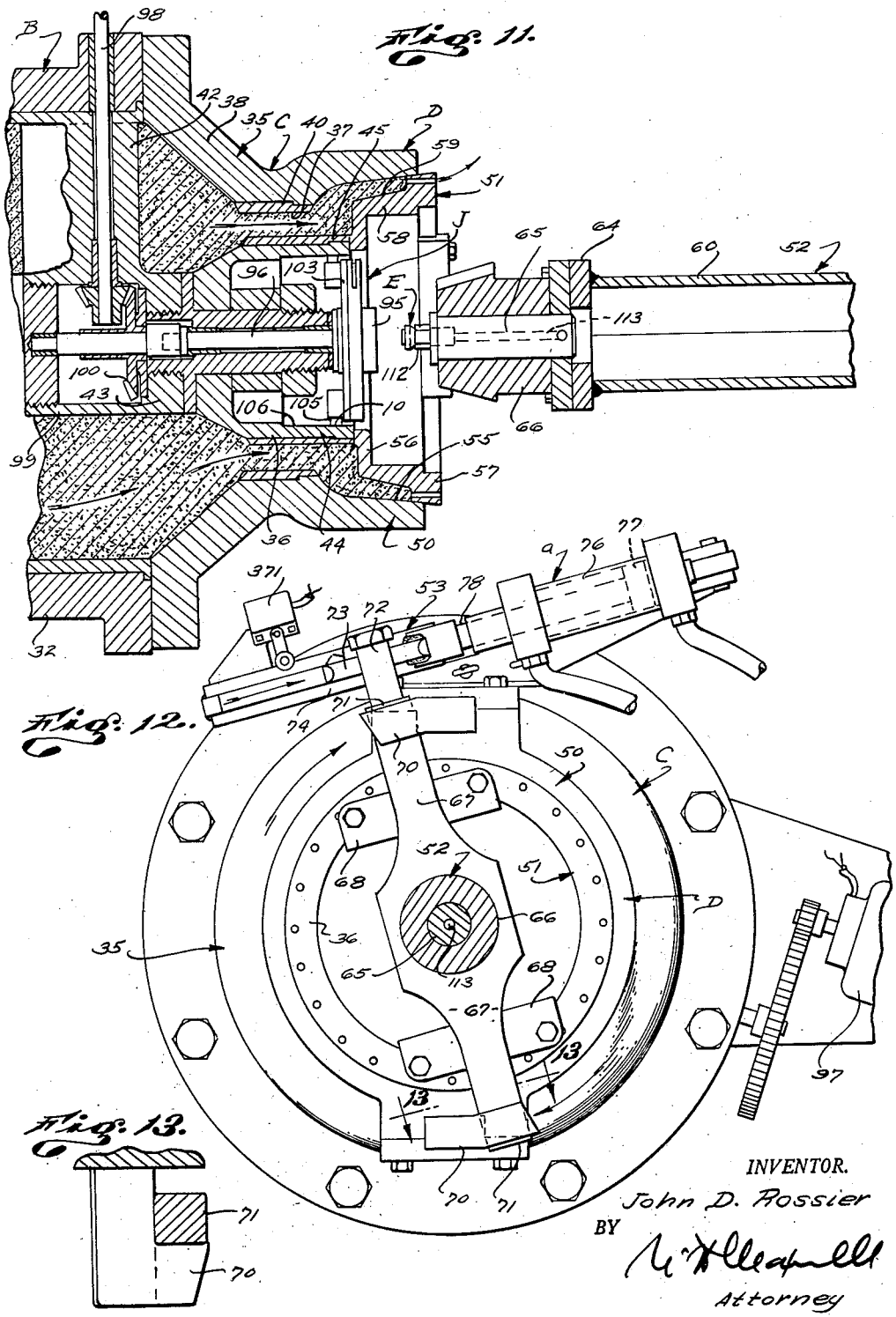

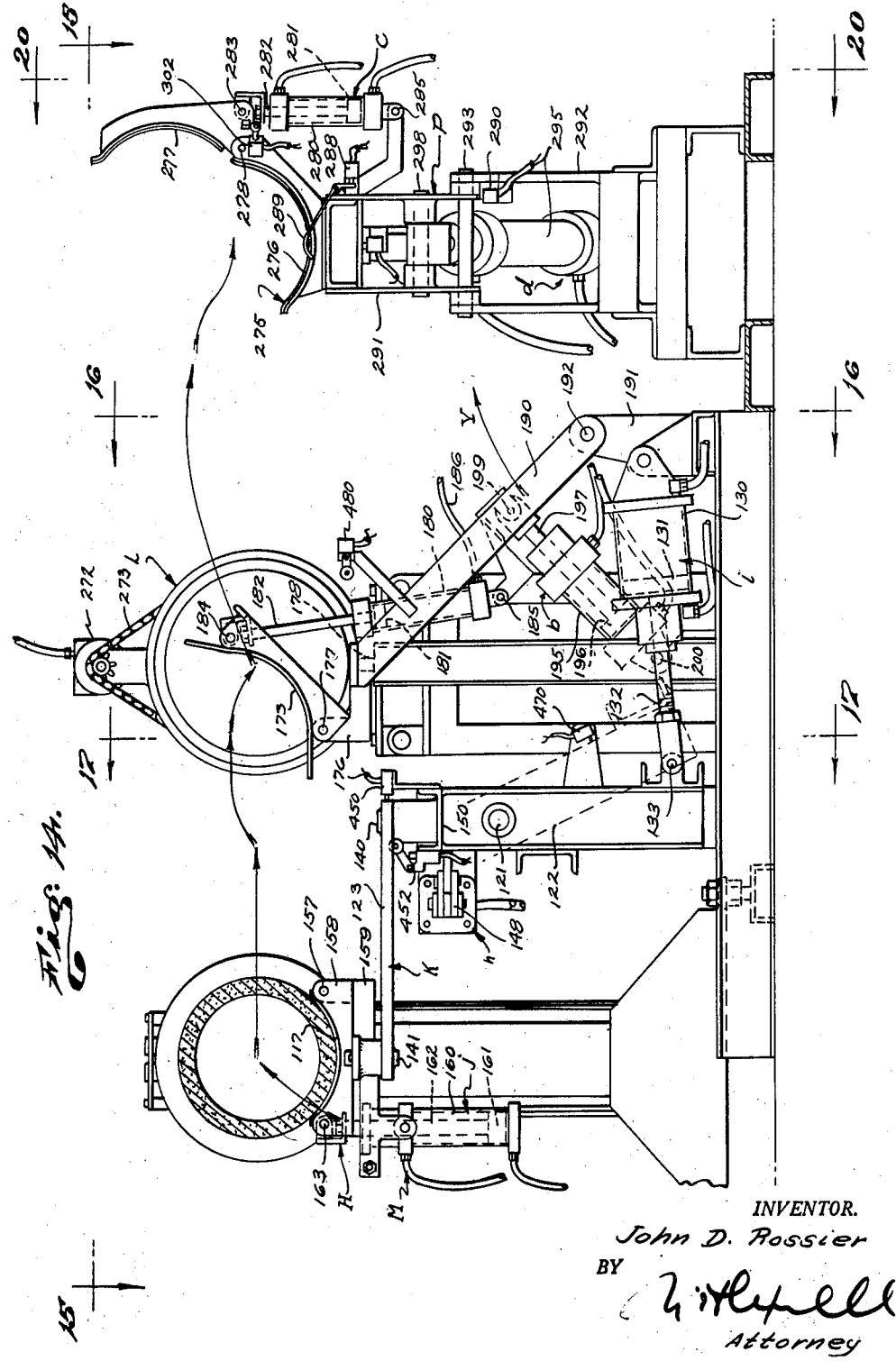

June 11, 1957   J. D. ROSSIER   2,795,027
MACHINE FOR MAKING CLAY PIPE OR THE LIKE
Original Filed Aug. 20, 1951   12 Sheets-Sheet 6
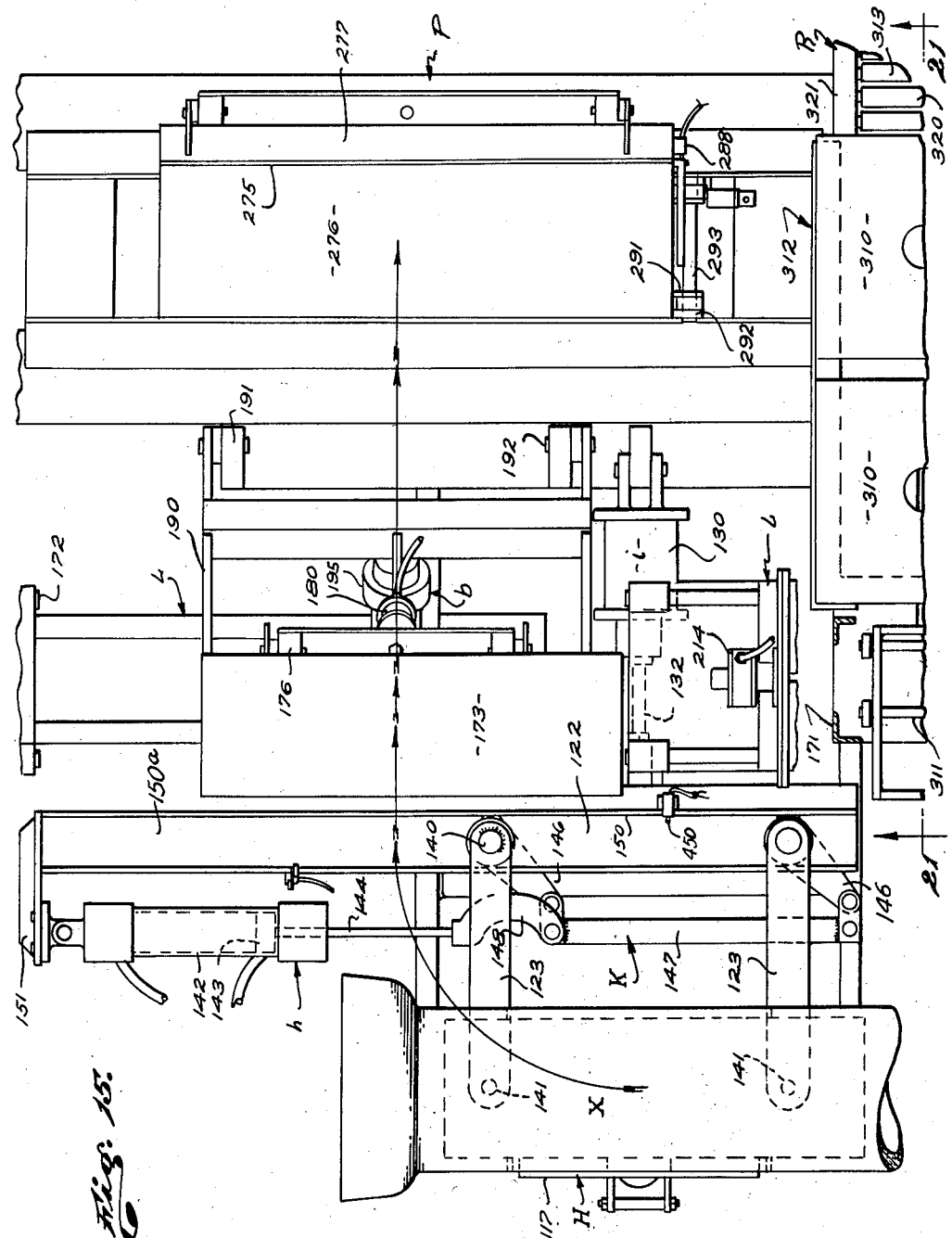
INVENTOR.
John D. Rossier
BY
Attorney

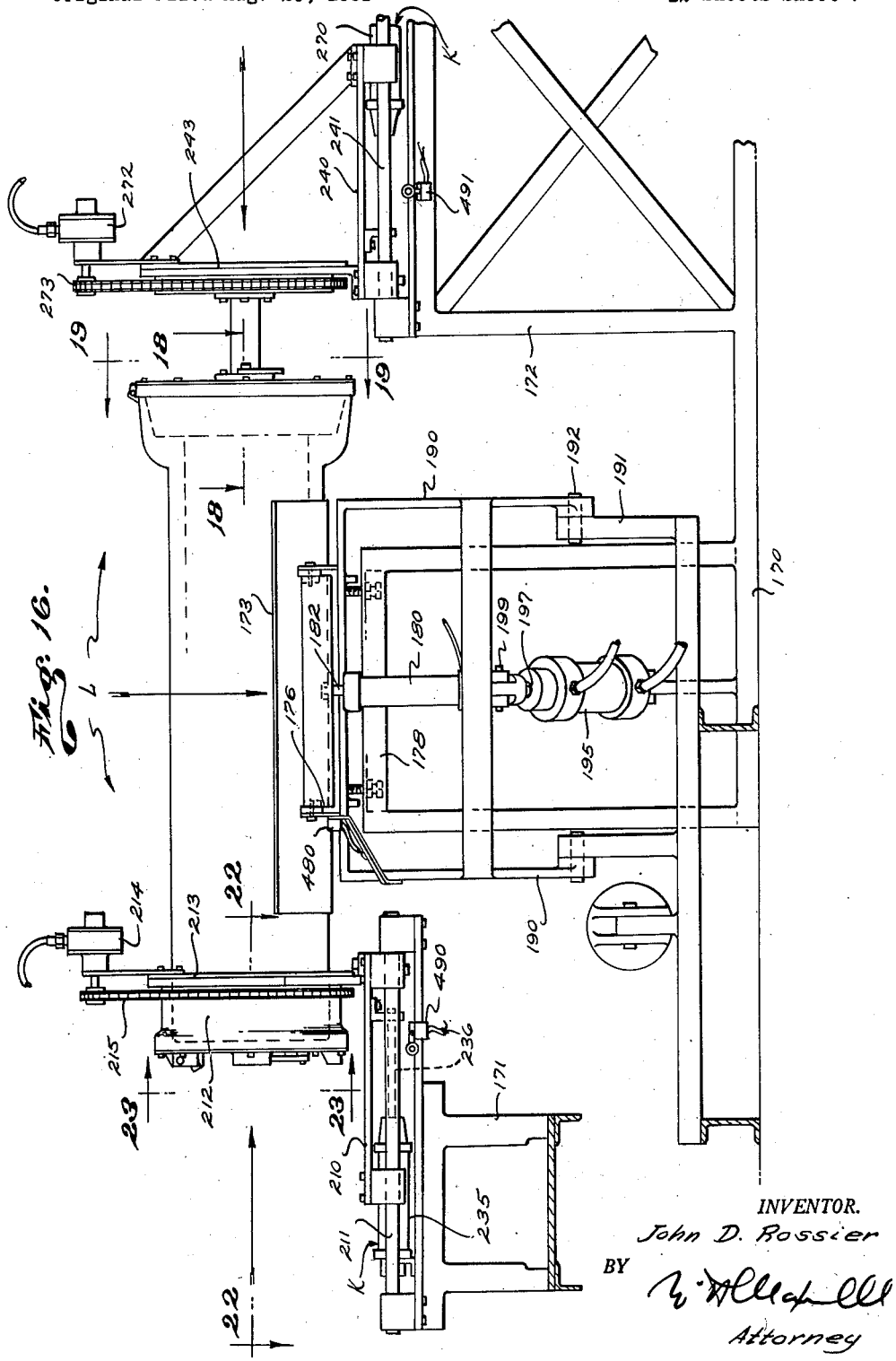

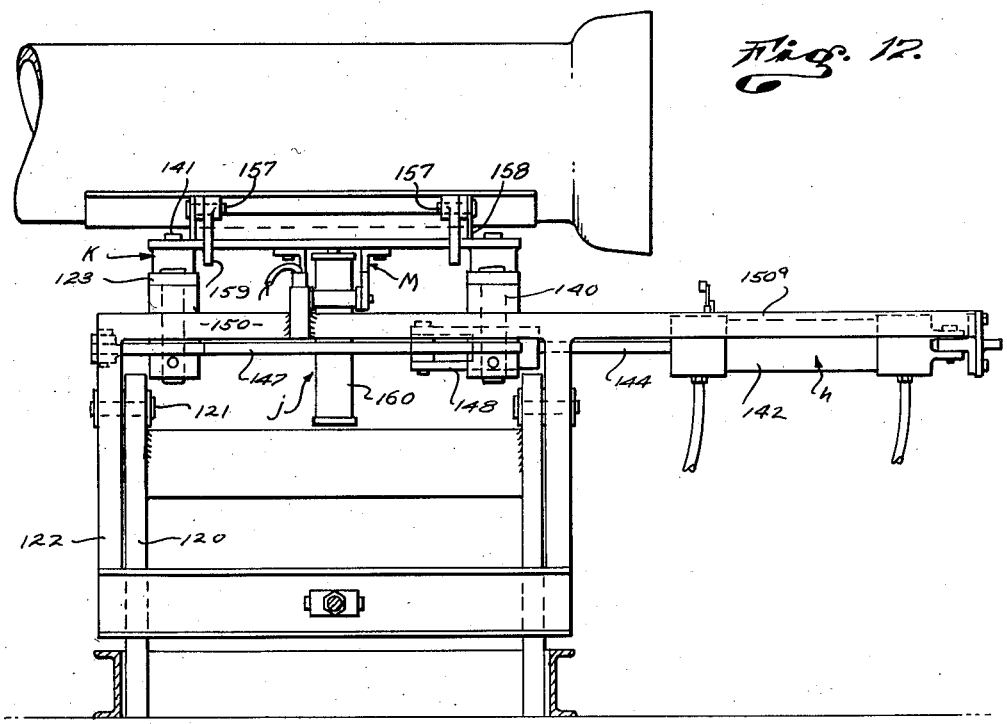
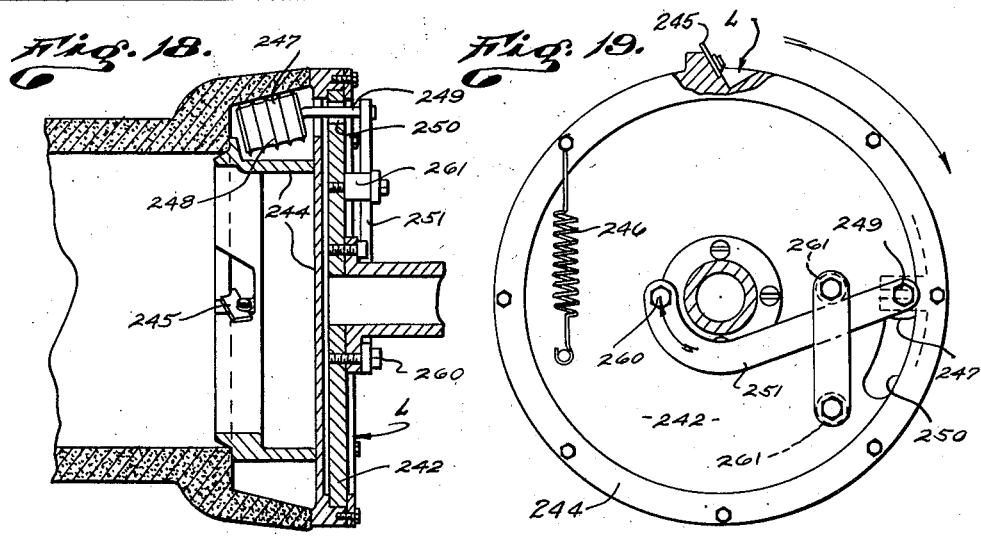

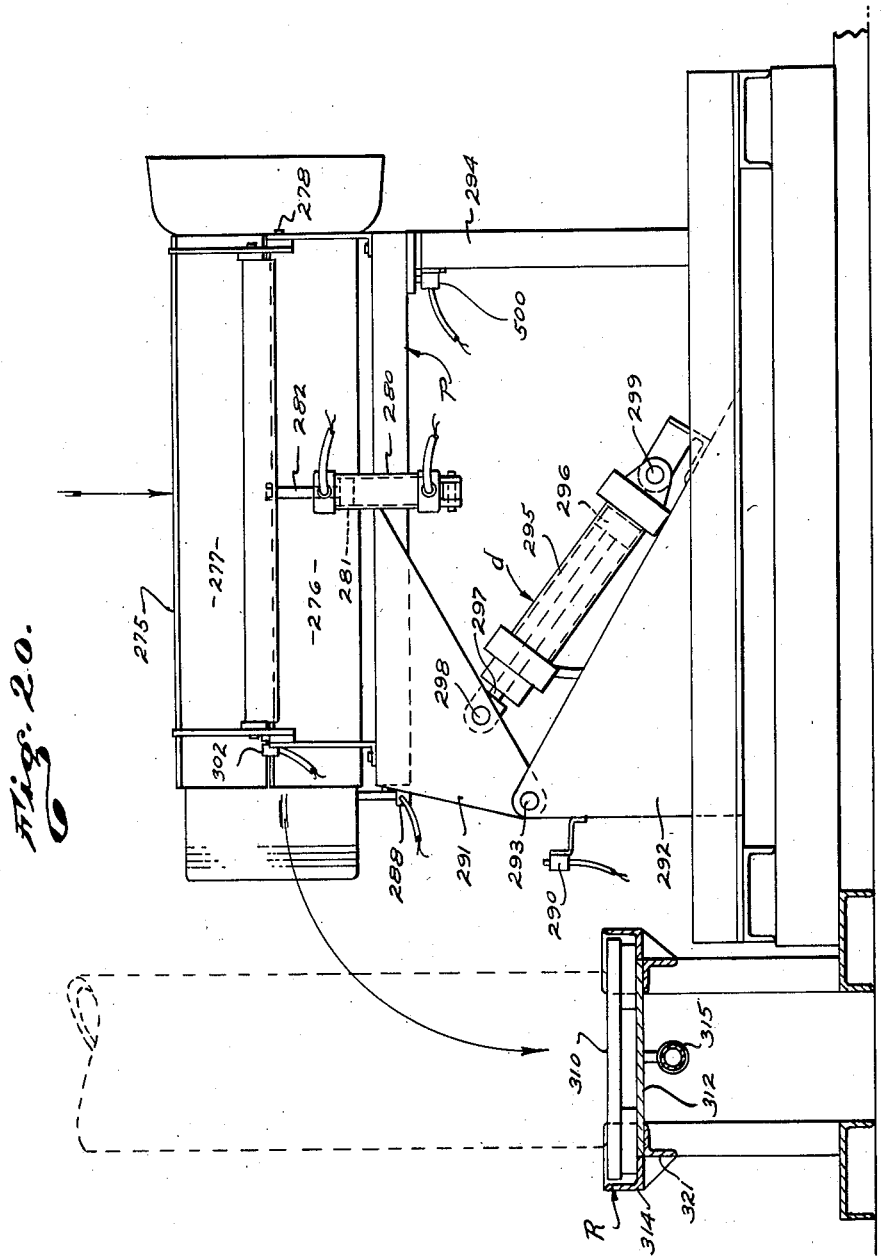

June 11, 1957 J. D. ROSSIER 2,795,027
MACHINE FOR MAKING CLAY PIPE OR THE LIKE
Original Filed Aug. 20, 1951 12 Sheets-Sheet 10
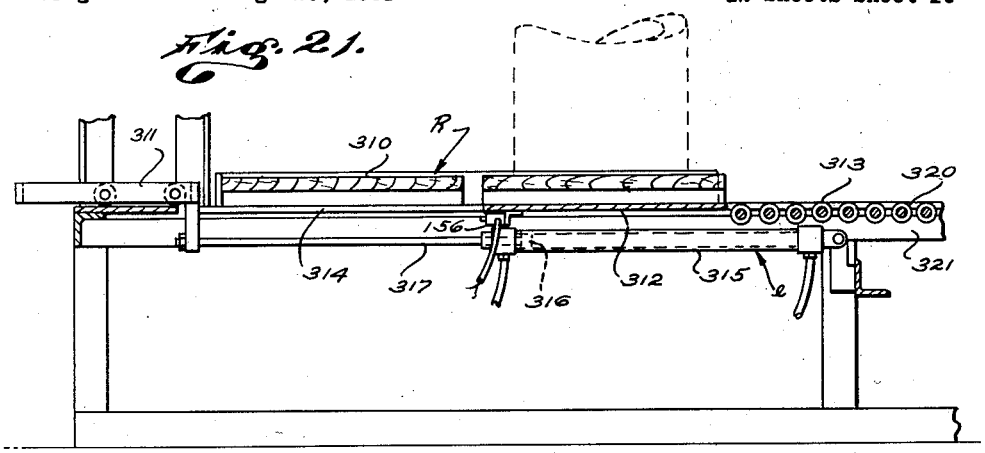
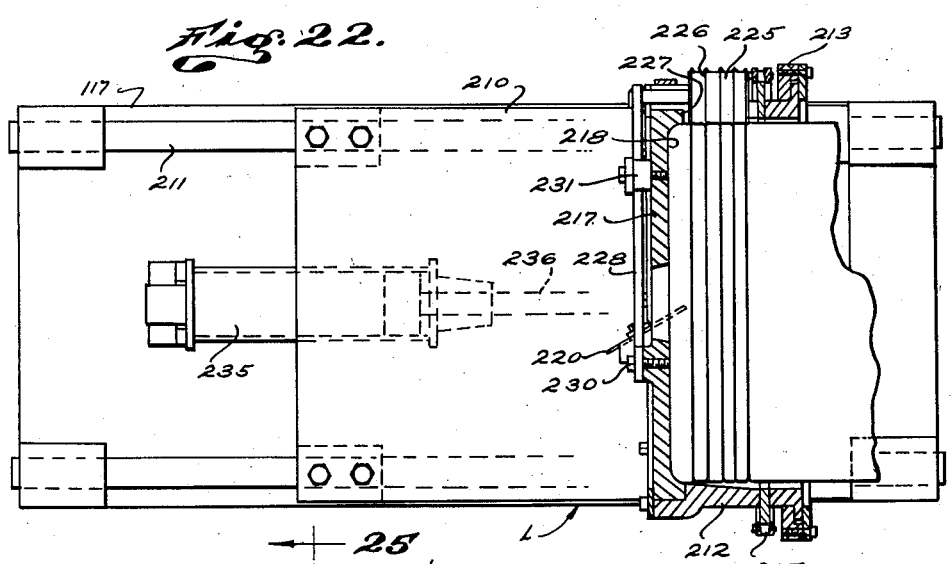
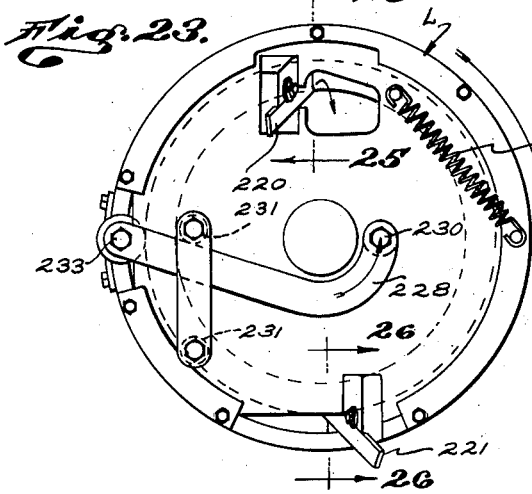
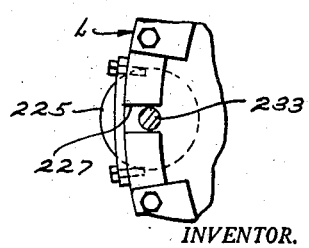
INVENTOR.
John D. Rossier
BY
Attorney

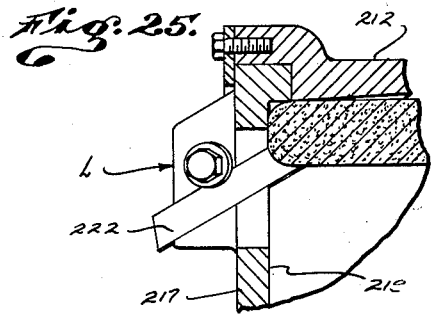
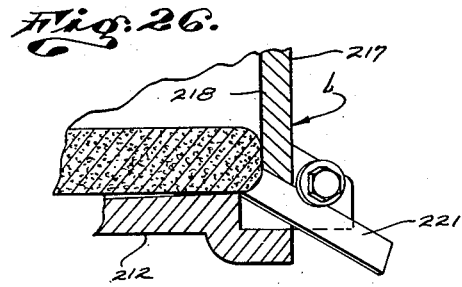
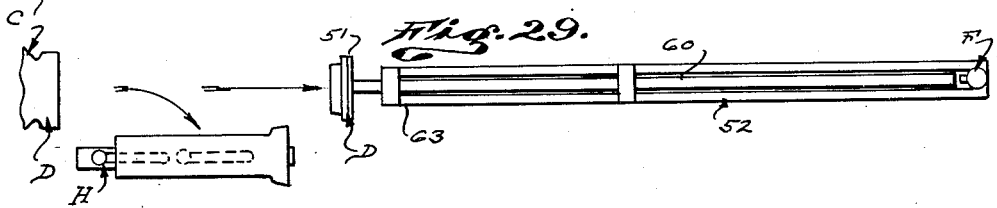
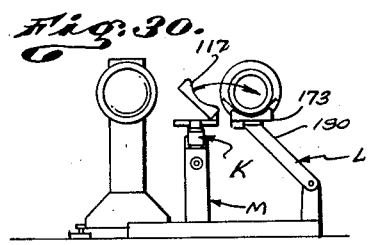
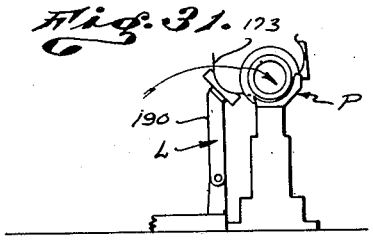
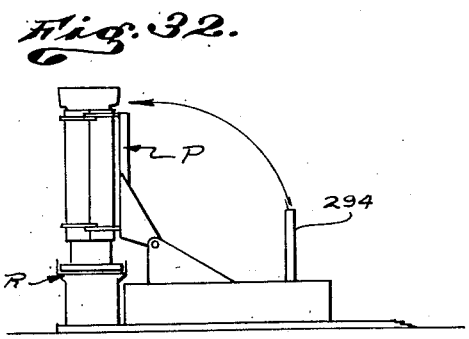
INVENTOR.
John D. Rossier June 11, 1957   J. D. ROSSIER   2,795,027
MACHINE FOR MAKING CLAY PIPE OR THE LIKE
Original Filed Aug. 20, 1951   12 Sheets-Sheet 12

*Fig. 33.*

INVENTOR.
John D. Rossier
BY
*W. H. Clapwell*
Attorney

United States Patent Office 2,795,027
Patented June 11, 1957

2,795,027
MACHINE FOR MAKING CLAY PIPE
OR THE LIKE

John D. Rossier, Compton, Calif., assignor, by mesne assignments, to Pearne & Lacy Machine Company, Los Angeles Calif., a corporation of California Continuation of application Serial No. 242,593, August 20, 1951. This application January 16, 1957, Serial No. 634,586

34 Claims. (Cl. 25—30)

This invention is concerned with a machine for making clay pipe, or the like, and it is a general object of the invention to provide a simple, dependable and practical automatic pipe making machine adapted to form raw materials into clay which is formed horizontally into pipe, which pipe is delivered vertically disposed on pallets, finished and ready for drying preliminary to firing.

This application is a continuation of my copending application Serial No. 242,593, filed August 20, 1951, and now abandoned.

It is well recognized that clay products, such as clay pipe or the like, are commercially produced from raw materials which are mixed to form a clay that is extruded and belled, following which the formed objects are generally arranged vertically for drying preliminary to being fired. In practice, commercial production of such clay products, particularly when the sizes are such as are used in sewage systems and the like, requires the supply of a large quantity of clay and generally requires the drying and firing of the formed products in an upright or vertical position. Further, in the case of standard or popularly used sizes or forms, rapid and economical production is important.

It is common practice in the production of clay products, such as clay pipe, even where large quantities are produced, to mix clay as by continuously operating clay forming apparatus and to handle the clay from such a source in an extruding device, combined with which are mechanisms for belling the extruded forms, and the formed units are then finished and conveyed or carried away in part or wholly by hand to be finally stored for drying and subsequent firing.

It is a general object of this invention to provide an automatic machine which is continuously operating, and which receives raw materials that are developed into clay, and which delivers units in the desired form and in the desired position, ready for drying, without any additional handling or manipulation whatsoever except, possibly, shifting bodily to locations where the drying is to occur. With the machine of the present invention, the various essential elements entering into the production of the objects to be dried are so related to each other and are so coordinated in action that rapid production results with a minimum handling of material, and the objects formed are ready for drying without requiring any manual handling or manipulation whatsoever.

It is another object of this invention to provide a machine of the general character referred to in which a clay supply means is provided and is operated intermittently in conjunction with a clay feeder that supplies clay to a primary forming device or die mechanism related to a bell forming mold having a cycle of operation timed relative to the action of the supply means.

It is another object of this invention to provide a machine of the general character referred to in which a cutting means is related to the mechanism by which the pipe is initially formed and belled, which cutting means is coordinated with a pipe supporting means that engages the pipe preliminary to its being severed and shifts the severed or cut pipe away from the elements that form and bell the pipe to a trimmer that operates in synchronism with the forming and belling mechanisms and performs final trimming operations on the pipe.

Another object of the invention is to provide a machine of the general character referred to in which the trimmer, that acts upon the formed and horizontally disposed pipe, simultaneously trims both ends of the pipe, performing desired trimming and scoring operations, and then serves to deliver the pipe to a turning and positioning mechanism that shifts it from the horizontal to a vertical position and deposits it on a pallet horizontally shiftable to a position where the pipe can be dried.

It is a further general object of the invention to provide a machine of the general character hereinabove mentioned wherein the pipe is initially formed in a horizontal position and, after being initially formed and belled, is maintained in a horizontal position, is shifted laterally but a limited amount, and is finally delivered in a vertical position with consequent minimum movement, handling, or shifting of the pipe, all of which makes for practical high speed quantity production.

A further object of the invention is to provide a machine of the general character referred to in which an extruder delivers a tubular pipe horizontally to a mold that bells the leading end of the extrusion, and in which an element maintains the extrusion under compression lengthwise until the desired length of pipe has been established, whereupon a support engages the extrusion and a cutter severs the pipe, freeing it for movement away from the axis of the extrusion while engaged by the support.

It is a further object of this invention to provide a machine of the general character referred to which establishes clay in the form of a horizontally disposed extrusion and includes means or mechanisms that act upon the extrusion to establish a bell on one end thereof, to trim it at both ends, and to finally deposit it on end or vertically disposed while at all times maintaining it under pressure or supported so that no deformation or sagging occurs in it.

It is another object of this invention to provide various improvements in the arrangement, relationship and construction of mechanisms of a pipe forming machine.

It is a further object of this invention to provide units, mechanisms and devices of the general character referred to which are useful in a pipe forming machine and which are of simple, practical form and construction.

The machine of the present invention includes a means supplying plastic material or clay, and this means involves a container carrying a supply of dry material, such as the raw, finely divided matter to enter into the clay, and it includes a duct carrying liquid such as water, under control of a valve. A feed for the raw material, such as a motor driven belt-type feeder, handles material from the container, and an electric control unit governs the action of the valve. The materials for the clay are handled by a mixer involving an upwardly opening chest, and agitators in the chest, and a power means operates the agitators and involves a motor and a clutch drive operating the agitators through a suitable gear box.

A clay feeder, preferably an auger type mechanism, receives clay from the mixer and involves a tubular body having a receiving end open to the mixer and a screw in the body that feeds the clay therethrough. The screw is operated from or through a gear box, which is clutch controlled.

A primary forming device or die mechanism is supplied with clay by the feeder and involves a female section or shell at the discharge end of the feeder body and a male section or core in the shell concentric therewith and spaced therefrom to form an annular channel.

A bell forming mold receives the extrusion from the primary forming device and involves a female section or cup-like socket joined to and continuing from the shell of the forming device, and a plug or closure cooperates with the socket and defines a cavity of such size and shape as to establish the desired pipe bell. The plug is carried on a reciprocating rod suitably mounted and power operated, and a power operated lock means is provided for releasably securing the plug engaged with the socket.

A pipe cutting means is provided in the socket and, in its preferred form, is a rotating cutter reversible as to direction of rotation and such that a blade is projected and cuts when operation is in one direction and is retracted when operation is in the opposite direction.

A pipe supporting means is provided and engages with the pipe, preferably beneath it, so the pipe is supported preliminary to completion of the cut. The supporting means is characterized by a cradle and mechanism by which the cradle shifts vertically as well as laterally, the action of which mechanism is coordinated with that of the other elements so the cradle is moved into supporting position when the extrusion of clay has stopped and immediately prior to each pipe being severed by the cutter, and is immediately thereafter operated to carry the severed pipe horizontally out of the path of the following pipe.

A pipe finishing means receives the pipe from the cradle, a transferring means being provided to effect transfer of the pipe from the cradle to the finishing means. The finishing means serves to simultaneously finish and score the spigot and bell ends of the pipe and immediately thereafter delivers the trimmed pipe to a turning or positioning mechanism in which the pipe is first gripped and then rocked or tilted endwise from a horizontal to a vertical position onto a pallet of a pipe handling means that operates the pallet horizontally and onto a conveyor out of the path of the following pipe.

The various objects and features of my invention will be fully understood from the following detailed description of a typical preferred form of apparatus and manner of carrying out the invention, throughout which description reference is made to the accompanying drawings, in which:

Fig. 1 is a side elevation of the machine provided by the invention showing a pipe ready to be severed. Fig. 2 is a plan view of the machine, being a view taken as indicated by line 2—2 on Fig. 1. Fig. 3 is an enlargement of a portion of the structure shown in Fig. 1, certain of the parts being shown in section to illustrate details of construction, the parts being shown positioned as they are when an initially formed pipe with a belled end is supported and ready to be cut. Fig. 4 is an enlarged detailed transverse sectional view taken as indicated by line 4—4 on Fig. 3. Fig. 5 is an enlarged detailed sectional view taken substantially as indicated by line 5—5 on Fig. 2. Fig. 6 is a plan view of a portion of the structure taken as indicated by line 6—6 on Fig. 3. Fig. 7 is a perspective view of a portion of the element that cooperates with the parts shown in Fig. 6. Fig. 8 is a view similar to a portion of Fig. 3 showing the parts positioned as they are in the course of the bell being formed on the pipe. Fig. 9 is an enlarged detailed view taken substantially as indicated by line 9—9 on Fig. 8. Fig. 10 is an enlarged view of the cutter alone, showing it as it appears when viewed in the direction indicated by line 10—10 on Fig. 8. Fig. 11 is an enlarged detailed plan section taken as indicated by line 11—11 on Fig. 8. Fig. 12 is an enlarged sectional view taken as indicated by line 12—12 on Fig. 8. Fig. 13 is a section taken as indicated by line 13—13 on Fig. 12. Fig. 14 is an enlarged transverse sectional view of the machine taken substantially as indicated by line 14—14 on Fig. 1. Fig. 15 is a plan view of the parts shown in Fig. 14, being a view taken as indicated by line 15—15 on Fig. 14. Fig. 16 is a vertical sectional view taken as indicated by line 16—16 on Fig. 14. Fig. 17 is a vertical sectional view taken as indicated by line 17—17 on Fig. 14. Fig. 18 is an enlarged detailed plan section of a portion of the trimming means showing the parts that trim the belled end of the pipe, being a view taken substantially as indicated by line 18—18 on Fig. 16. Fig. 19 is an end view of the parts shown in Fig. 18, being a sectional view taken as indicated by line 19—19 on Fig. 16 and showing certain of the parts broken away to appear in section. Fig. 20 is a vertical sectional view taken substantially as indicated by line 20—20 on Fig. 14. Fig. 21 is a view taken substantially as indicated by line 21—21 on Fig. 15. Fig. 22 is an enlarged detailed plan section taken substantially as indicated by line 22—22 on Fig. 16. Fig. 23 is an end view of parts shown in Fig. 22, being a view taken as indicated by line 23—23 on Fig. 16. Fig. 24 is an enlarged view of a portion of the structure shown in Fig. 23. Fig. 25 is an enlarged detail of a portion of the structure shown in Fig. 23, being a view taken in the direction indicated by the line 25—25 on Fig. 23. Fig. 26 is an enlarged detail of a portion of the structure shown in Fig. 23, being a view taken as indicated by line 26—26 on Fig. 23. Figs. 27 to 32, inclusive, are diagrammatic views illustrating various steps in the process of manufacture carried out by the machine of the present invention. Fig. 27 indicates the positioning of parts as the bell is formed. Fig. 28 indicates the positioning of parts when the pipe has been initially formed and belled and is ready to be cut. Fig. 29 indicates the positioning of parts that occurs as the belled pipe is being removed from the axis of extrusion illustrated in Figs. 27 and 28. Fig. 30 is a view illustrating the transfer of the pipe to the trimming means. Fig. 31 illustrates transfer of the pipe from the trimming means to the mechanism that finally delivers it in an upright position, as illustrated in Fig. 32. Fig. 33 is a combination electrical and hydraulic circuit diagram illustrating, in a general way, the control system and interconnection of parts as provided by the present invention, and in particular the relationship of fluid pressure actuated units and their control valves and the electrical actuators for such valves, certain of which features are not otherwise shown in the drawings.

The present invention contemplates, generally, the production of units such as belled clay pipes, and the machine serves to produce such units in a form and position ready for drying and starts operation with the raw or basic materials that enter into the pipe. In accordance with the broader principles of the invention, various units, objects, or articles may be formed, but since belled clay pipe presents a typical and practical example, this particular product will be referred to in detail, but reference to it is not to be construed as in any way limiting or restricting the invention or those aspects of the invention which are applicable to other products.

The invention provides a means A supplying plastic material or clay, and, in its preferred form, this means involves a container 10 carrying raw material, a duct 11 supplying water, a feed device 12 handling material from the container, a mixer 13 in which material from the container is mixed with water from the duct, and power means 14 driving the mixer.

The container 10 is shown as a carrier suitable for handling finely divided or powdered raw material, preferably dry material, for making or working into clay, and it is shown as opening downwardly to the feed device 12. The duct 11 is shown as an ordinary water supply pipe, and it is provided at or close to its discharge end with a control valve 15 equipped with an electrical operating unit 16.

The mixer 13 is shown as involving a horizontally disposed upwardly opening chest 17 and a plurality of agitators 18 in the chest adapted to be rotated to effect intimate mixing of materials from the container 10 with water from the duct 11. In the particular case illustrated, the chest is elongate in form, and there are two agitators parallel with each other and extending longitudinally of the chest.

The feed device 12 is shown as a belt-type feeder that is motor driven. The feed belt 20 is shown supported by rollers 21 so that the belt extends beneath the discharge opening of the container, and a motor 22 is provided to operate one of the rollers so that the belt operates in a manner to carry material from the container to a point over the chest where the material discharges into the chest.

The power means 14 provided for operating the mixer is shown as including a motor 23 operating a drive shaft 24 through a suitable belt drive 25. The drive shaft 24 operates a drive head or gear box 26 through a clutch 27, the drive head being such as to include drive parts connecting the driven element of the clutch with the agitators 18 of the mixer. The clutch 27 may, in practice, be of any suitable form or type. However, where the machine is characterized by fluid pressure actuated units as hereinafter described, it is preferred that the clutch be this type, in which case it is under control of a power unit $f$ (Fig. 33) including a valve 30 operated by an electrical operating unit 31. In accordance with the present invention, the operating unit 16 controlling valve 15, the operating unit 31 controlling the clutch, and the circuit controlling motor 22 are related or interconnected as hereinafter explained so that these elements operate in unison, that is, so that they are either all on or all off as the operating condition requires. The control system is illustrated in Fig. 33 of the drawings.

A clay feeder B receives the clay formed in or by the mixer 13, and, in practice, it is preferably an auger type mechanism shown as involving a horizontally disposed tubular body 32 and a screw or auger type element 33 disposed in the body and driven by a shaft 34 projecting from the head 26 operated from motor 23 through the clutch 27. Through this construction, as the feeder operates, it advances clay horizontally, and since it is tied into or connected with the supply means through the head 26, it operates simultaneously with the mixer and is out of operation when the mixer is not operating.

It is to be understood that, in practice, the head 26 may be any suitable gear mechanism or drive head handling power from the driven element of the clutch 27 so that the agitators 18 and shaft 34 are driven at the desired speeds and in the desired directions, as circumstances require.

A primary forming device C is related to the clay feeder B to receive clay therefrom and to form it into an elongate annular body. The forming device C is in the nature of an extrusion die and, in the case illustrated, is characterized by a horizontally disposed female or shell section 35 (Fig. 11) and a male or core section 36 within the shell and suitably spaced therefrom.

The female section or shell of the primary former C is joined to or carried by the tubular body of the clay feeder to be at and project from the discharge end of the feeder, and it is formed to have a clay passing opening 37 of suitable size and shape. In the case illustrated, the female section has a tapered or funnel-like portion 38 that receives clay from the feeder and directs it into the passage 37 where pipe is being formed. As is here described, the opening 37 is round in cross section and is of the size desired for the exterior of the pipe body. In the preferred construction, a renewable or replaceable liner 40 is provided in the female section defining the opening 37 so that this portion of the structure can be advantageously renewed or replaced as circumstances may require.

The core 36 of the forming device C is located centrally in the female section and, in the case illustrated, is carried by spaced webs 42 projecting inwardly at the delivery end of the feeder body, and a neck portion 43 projects from the supporting webs centrally of the structure and carries a core head 44, the exterior of which is within the opening 37 and cooperates with the wall of opening 37 to define the form, shape, and size of the extrusion that results from clay being forced through the forming device by the action of the feeder. In the particular case illustrated, the head 44 is round in cross section and is spaced from the wall of opening 37 to establish a pipe body having the desired wall thickness and having a round opening. Further, a replaceable sleeve 45 is shown on the head 44 so that this part of the structure can be readily removed or replaced, as circumstances may require.

The present invention provides a bell forming mold D operable to form a cup or bell on the leading end of the extrusion formed by the forming device C. In practice, this portion of the mechanism may be varied widely to provide a socket or bell of any desired form, shape, or type. In the drawings, I have shown merely a simple, conventional mold by which a common form of bell is established on the pipe.

The bell forming mold includes, generally, a female section or socket 50 and a male section or plug 51 that cooperates with the socket, a mounting structure and operable mechanism generally designated 52 that supports the plug for reciprocation, a lock means 53 that connects the socket and plug in engaged relationship, and a power means $g$ (Figs. 3, 8, and 33) that operates the plug through or by means of the mounting means 52.

The socket 50 is shown as carried by and projecting from the female section 35 of the forming device C, and it has a horizontally opening socket 55 continuing from the opening 37 and in the form of a suitably shaped enlargement beyond and continuing from opening 37. The socket 55 is shaped and proportioned to form or establish the desired exterior on the bell formed on the end of the pipe.

The plug 51 is carried by the mounting means 52 so that it is concentric with the socket 50, and it is shaped and proportioned so that, when engaged with the socket, it forms a closure therefor and cooperates with the socket to form an opening or cavity that will establish a bell or socket on the pipe of the desired size and shape. In the case illustrated, the plug 51 has an inner end or plate portion 56 which is adapted to engage and seat against the outer end of the male section or core 44 of the forming device C. The plug has an outer end or flange portion 57 adapted to fit into the outer or mouth end of the socket 50 to form a closure for the socket. A middle or intermediate portion 58 connects the plate 56 and the flange 57, and its exterior portion 59 is formed or tapered to define the tapered interior of the socket formed on the pipe. The relationship of the socket and plug is illustrated in Fig. 11 of the drawings.

The mounting means 52 for plug 51 involves, generally, a mounting rod 60, supporting elements 61 carrying the rod 60 horizontally and for reciprocation in line with the mold socket 50, and a coupling mounting the plug on the end of the rod 60 that faces the plug and socket.

In the form of the invention illustrated in the drawings, the rod 60 is of substantial length and is mounted horizontally between supporting elements 61 so that it is concentric with the feeder B and forming device C and with the mold D. The rod 60 is shown (Fig. 4) as an elongate tubular element, rectangular in cross sectional configuration, and the supporting elements 61 are shown as rollers carried by a frame 63 so that they engage the rod 60 to maintain it in the desired horizontal, aligned position, at the same time supporting it so that it can be freely reciprocated relative to the socket 50.

Through the construction just described, the rod 60 is held against rotation. The coupling by which the plug 51 is mounted on the socket facing end of rod 60 provides for rotation of the plug relative to the rod. In the particular case illustrated, the coupling includes a base plate 64 fixed on the end of the rod 60 and a spindle 65 (Fig. 11) projecting from plate 64. A hub 66 is rotatably supported on the spindle, and arms 67 project from the hub and support the plug 51 through brackets 68.

The lock means 53 serves to releasably secure the plug engaged with the socket, as shown in Fig. 12 of the drawings. In the particular case illustrated, the lock means involves hooks 70 on the outer end of the socket 50, and extensions 71 of the arms 67 engageable with or under the hooks. An operating means for the hook structure is shown as involving a finger 72 projecting from or beyond one of the extensions 71 and engageable in a notched block 73 slidably carried in a suitable guideway 74 on the socket 50. The notch of block 73 faces out or toward the rod 60 so that the finger 72 can be moved into and out of the notched block through reciprocation of the rod 60. The normal or unactuated position of the notched block 73 is such as to receive the finger 72 in position where the extensions 71 of arm 67 are clear of but ready to enter the hooks 70. The block 73 is operable in the guideway 74 to shift the finger 72 and thereby operate extension 71 into engagement with the hooks 70.

A power means $a$ (Figs. 8, 9, 12, and 33) is provided for operating the notched block 73 and is shown as involving a fluid pressure actuated mechanism including a cylinder 76, a piston 77 in the cylinder, and a rod 78 connected with the piston and to the block 73. A suitable valve 79 controls the action of the cylinder and piston mechanism just described and is operated by an electrical actuating unit 80.

The power means $g$ provided for operating the plug 51 operates the plug through the rod 60, that is, the parts are related so that the rod 60 is reciprocated with consequent movement of the plug relative to the socket. In the case illustrated, the means $g$ is shown as including a fluid pressure actuated structure in which there is a stationary cylinder 81, a piston 82 operating in the cylinder, and a rod 83 connecting the piston 82 and the rod 60. The operation of the fluid pressure actuated means just described is under control of a valve 86 subject to operation in opposite directions. The valve 86 is under control of electrical operating units 87 and 88. In accordance with the present invention, air is employed as the fluid for actuating the means $g$ in order to gain the action hereinafter described, whereby the plug maintains pressure on the belled pipe as the body of the pipe is extruded.

In the preferred form of the invention, a snubbing means F is provided to check movement of the plug carrying rod 60 to stop or limit overtravel of the rod beyond a fully retracted position. The rod with the parts thereon is of substantial mass, and it has a considerable travel, with the result that, when it is moved away from the belled pipe to a fully retracted position, it may tend to overtravel. The snubber may be any suitable form of movement stopping or checking device that will stop travel of the row 60 without causing it to bounce back. In the case illustrated, the snubber, as shown in Fig. 5, involves a stop pin 90 positioned to be engaged by the rod 60 when the rod has moved beyond its fully retracted position. The pin 90 is, in effect, a plunger operating in a cylinder 91 carrying liquid, and suitable fluid connections 92 connect the cylinder with a liquid carrying reservoir 93 where a suitable head pressure is maintained on the supply of liquid by air delivered through a supply pipe 94. When the rod 60 strikes the pin 90, the pin is depressed into the cylinder 91, forcing liquid therefrom and into the reservoir, and when the rod 60 is moved away from the pin 90, the air pressure on the liquid in the reservoir re-establishes the pin 90 in an unactuated position ready for a subsequent operation.

A pipe cutting means J (Fig. 11) is provided to cut a fully formed or completely extruded pipe body from the extrustion issuing from the primary forming device C when the desired pipe body has been formed. In accordance with the present invention, the pipe cutting means J is characterized by a cutter located in the socket 50, and it is a rotating device reversible as to direction of rotation and serving to cut when rotated in one direction, and to be retracted when rotated in the opposite direction.

In the form illustrated in the drawings, the cutter that is located in the socket 50 involves a head 95 mounted on a shaft 96 concentric with the socket. A reversible drive is provided for operating the shaft 96 and is shown as involving a reversible motor 97 and an operating connection from the motor to shaft 96. The motor 97 is preferably external of the clay handling parts, and in the arrangement illustrated, the operating connection between the motor 97 and the shaft 96 involves a shaft 98 driven by the motor 97 and extending into a housing 99 supported by the ribs 42 that carry the stem 43. The shaft 96 is rotatably supported in the structure formed by parts 43 and 44, and it extends into the housing 99 where it is connected with shaft 98 through a gear drive 100.

The cutter includes a blade 101 carried by the head 95 through a pivot pin 102, the blade being so mounted as to be movable between a retracted position such as is shown in Fig. 10 where it will clear the interior of the pipe extruded by the means C, and an operating position where it projects from the head 95 far enough to cut completely through the wall of the extrusion. In the case illustrated, an operating means for the blade 101 includes an actuator or plate 103 pivotally connected with the head 95, for instance, pivotally supported on the shaft 96 adjacent the head 95, and fingers 104 on the actuator spaced apart and having the blade 101 engaged between them. Drag members or friction shoes 105 are provided on the actuator 103 and are arranged to engage in the opening 106 occurring in the core portion 36 of the plug 51 located in socket 50.

The shoes 105 resist rotation of the actuator in the plug, and as a result, when the cutter is rotated in one direction or as indicated by the arrow in Fig. 10, the actuator assumes a position relative to the head 95 where the blade 101 is retracted. When the shaft is rotated in the opposite direction, the actuator and head assume a position where the blade 101 operating between the fingers 104 projects a substantial distance outwardly and far enough outwardly to cut completely through the extrusion. It is preferred, in practice, that a stop means be provided to limit the relative rotation between the head and actuator. In the drawings, a stop pin 110 is shown provided on the actuator 103 operating in a slot 111 provided in the head 95.

From the foregoing description, it will be understood that, when the rod 60 is operated to a position such as is shown in Fig. 11 and the lock means is then actuated to lock or to unlock the plug 51 engaged with the socket 50, a limited amount of rotation occurs between the plug and the socket. It is highly desirable, in practice, that the clay body forming the pipe and the bell on the pipe be free of undesirable torque or strains such as might result from excessive drag caused by this rotation of the plug during the unlocking operation. In accordance with the present invention, a lubricating means E is provided and serves to supply the elements of means D with fluid or lubricant.

In the case illustrated, a spray nozzle 112 is provided at or within the plug 51 and may be supplied with suitable fluid through a passageway or duct 113 within the structure supporting the plug. The desired fluid is supplied to the duct 113 through a flexible supply line 114 and is under control of a valve 115 operated by a cam actuator 116 (see Fig. 8) so that, as the rod 60 is operated causing the plug 51 to approach the socket 50, a suitable amount of liquid is sprayed into the socket and, consequently, lubricates the plug and socket in the desired manner. The cam actuator is such that there is but momentary opening of the valve 115, and the valve is closed when the plug 51 reaches the working position in connection with the socket.

The valve 86 controlling the action of means g is so operated by the electrical operating units 87 and 88 that the rod 60 is initially advanced or moved into a position where the plug 51 engages the socket 50, as shown in Fig. 11 of the drawings. Following the forcing of material into the mold D to form the bell of the pipe, the lock 53 is released, freeing the plug 51 from the socket 50 and leaving only pressure in the means g to hold the plug in the socket and to resist movement of the plug away from the socket. This resistance to movement of the plug 51, created by the means g, is maintained as extrusion of the body occurs, and as a result of this, as the pipe body is formed and the bell of the pipe leaves the socket and moves away from the socket, pressure is maintained on the pipe or on the extrusion lengthwise thereof, preventing collapse or sagging thereof. The control provided by the invention is such that this pressure is maintained on the extruded pipe until such time as a suitable support is provided for the pipe, making such end pressure no longer necessary, whereupon the valve 86 in the power means g reverses so that the rod 60 is retracted to carry the plug away from the pipe.

A pipe supporting means H is provided for engaging the pipe, preferably beneath the same and against the body portion of the pipe, rather than against the belled end portion thereof. The supporting means operates to engage and support the pipe while the pipe is maintained under longitudinal pressure or compression and before the cutter has operated to sever the pipe from the extrusion issuing from the means C.

The means H is characterized by a cradle 117 engageable under the pipe and by a mounting or supporting means carrying the cradle for vertical movement into and out of position where it engages beneath the extruded pipe prior to the pipe being cut, and a power means i (Figs. 14, 15 and 33) is provided for operating the supporting means. The cradle 117 is shown as an elongate trough-like element sufficiently long so that it will engage beneath a substantial portion of the pipe body, and its contour is preferably such as to correspond to the exterior of the pipe body.

Considered generally, the means carrying the cradle 117 is a pivotal support or mounting, and in the drawings, it is shown as involving fixed vertical standards 120 (Fig. 17) carrying a horizontal pivot 121 that supports a rocker 122. The rocker has an upwardly projecting portion above the pivot 121 carrying swingable arms 123 which are operable to a position where they project laterally from the rocker. The arms have the cradle 117 mounted on them. The combined structure formed by the rocker 122 and arms 123, when the parts are positioned as shown in Fig. 14, is substantially L-shaped, with the rocker extending vertically and the arms 123 extending horizontally. In the preferred construction, the cradle is mounted on the outer ends of the arms through a head 159 on which the cradle is pivoted and to which the arms are connected.

The power means i, provided for operating the mounting means of the cradle, is preferably a fluid pressure actuated mechanism and is shown as involving a pivotally supported cylinder 130, a piston 131 operating in the cylinder, and a rod 132 carried by the piston and pivotally connected at 133 to the depending portion or arm of the rocker 122.

The parts just described are best shown in Fig. 14 of the drawings, and when the piston 133 is in an advanced position, as indicated in this figure of the drawings, the rocker 122 is substantially vertical, the arms 123 are substantially horizontal, and the cradle 117 is in pipe supporting position. When the piston 131 is moved to the other end of the cylinder, the depending arm of the rocker is moved toward the cylinder 130, and the arms 123 are moved or swung down so that the cradle 117 is below the pipe to be spaced therefrom and clear of both the body of the pipe and the bell that occurs on the pipe. The cylinder and piston mechanism just described is under control of a valve 138 operated by an electrical operating unit 139.

A cradle shifting means K is provided and serves to shift the cradle 117 horizontally while it is maintained in the elevated or pipe supporting position such as is shown in Fig. 14. In the preferred construction, the arms 123 are like parallel members having fixed ends pivoted on the upper end of the rocker 122 by pivot members 140, and they have their outer ends pivoted to the under side of the cradle carrying head 159 by pivot pins 141. Through this construction, the cradle is supported from the rocker through the arms 123 so that, by shifting or pivoting the arms, the cradle is swung in the direction indicated by the arrow X in Fig. 15.

The means h for shifting the cradle is shown (Figs. 14, 15, and 33) as involving a fluid pressure actuated mechanism having a cylinder 142, a piston 143 in the cylinder, and a rod 144 operated by the piston and suitably coupled with the arms 123. In the case illustrated, the pivot members 140 are rotatably supported by the rocker, the arms 123 are fixed to the pivot members 140, and the rod 144 is coupled to the pivot members 140 by lever arms 146 projecting from the members 140. A connecting rod 147 extends between the lever arms while a link 148 is pivotally connected with the rod 147 and with the rod 144. The particular construction illustrated involves a horizontal beam 150 at the upper end of the rocker 122, and the pivot members 140 are rotatably carried by the beam. An extension 150ª of the beam has a bracket 151 at its outer end to which the cylinder 142 is pivotally connected.

Through the construction just described and best shown in Figs. 14 and 15 of the drawings, the fluid pressure operating mechanism h serves to swing or operate the arms between the extended position shown in Fig. 15, where the cradle is beneath the initially formed pipe, and a retracted or folded position where the arms are substantially parallel with and overlie the beam 150, in which latter case the cradle has been moved in an arc away from the socket in the direction that the socket opens or faces and laterally from the axis of the socket to a position laterally offset horizontally from the axis of the structure serving to form the pipe. The operation of the fluid pressure mechanism formed by cylinder 142 and piston 143 is under control of a valve 155 actuated by an electrical actuating unit 156.

A pipe finishing means L (Figs. 14, 15, and 16) is provided to receive the pipe from the cradle hereinabove described, and a transfer means M (Figs. 14 and 17) is provided for operating the cradle so that the pipe carried thereby or resting therein is delivered therefrom to the finishing means L.

The transfer means M involves a pivotal mounting of the cradle and a power means j (Figs. 14, 17, and 33) for rocking or tilting the cradle when the cradle has been moved to a position where the pipe will be received by the finishing means upon being discharged from the cradle. In the construction illustrated, the cradle 117 is mounted on head 159 by pivots 157 supported by brackets 158 on head 159. When the cradle 117 is in the position shown in Fig. 14, it is not only pivoted to but also rests on and is supported by the head 159.

The power means j of the transfer means M is preferably a fluid pressure actuated mechanism serving to rock or tilt the cradle about its pivotal mounting 157 to a position such as is shown in Fig. 30, and to such extent that the pipe in the cradle will discharge or roll therefrom to the finishing mechanism or means L by the action of gravity. The power means for rocking the cradle 117 is shown as including a cylinder 160, a piston 161 in the cylinder 160, and a rod 162 operated by the piston 161 and connected to the cradle by a pivot 163. The cylinder 161 is carried by or fixed to the head 159 and depends therefrom, and the rod 162 projects upwardly and pivotally connects to the cradle so that, when the piston 161 moves upwardly in the cylinder 160, the cradle is swung or rocked about the pivot 157. A valve 165 controls the operation of the fluid pressure actuated mechanism that rocks the cradle, and an electrical actuating unit 166 is provided for operating the valve 165.

The pipe finishing means L, best shown generally in Figs. 14 and 16 of the drawings, involves, generally, a frame with a central base section 170 and end sections 171 and 172. A pipe receiving seat 173 is carried by the central section 170, while a mechanism for finishing the bell end of the pipe is carried by section 172, and a mechanism for finishing the spigot end of the pipe is carried by the section 171.

The seat 173 of the means L is carried by a mounting 176, and the mounting 176 is supported for movement between a pipe receiving position and a pipe discharging position. The seat 173 is an elongate concave element corresponding generally in size and shape with the cradle 117, and it is connected to the mounting 176 through a pivotal connection 177 so the seat is shiftable between an up position such as is shown in Fig. 14 and a down position such as is shown in Fig. 30 where the seat is so disposed as to effectively maintain a pipe therein in line with the mechanisms provided for trimming the ends of the pipe. When the mounting 176 is in the pipe receiving position shown in Fig. 14, it is engaged on a standard or rest 178.

Means is provided for normally yieldingly maintaining the seat 173 in an up or elevated position such as is shown in Fig. 14, and in the case illustrated, this means involves a cylinder 180, a piston 181 in the cylinder 180, and a rod 182 extending from the piston and coupled to the seat by a pivot pin 184. The cylinder is pivotally anchored at 185, and fluid, such as air, is supplied at a suitable pressure to the lower end of the cylinder through a supply duct 186. The pressure maintained in the lower end of cylinder 180 is such as to normally hold the seat elevated. However, when a pipe from the cradle is discharged onto the seat, the pressure thus applied to the seat is such as to depress the seat and cause the piston 181 to move down in the cylinder until the seat reaches its down position, where it rests solidly on the mounting 176.

The mounting 176 that pivotally carries the seat 173 is carried by a pair of arms 190 pivotally connected to brackets 191 by horizontal pivot pins 192. The axis of the pivot pins 192 is located so that, when the arms 190 are swung in the direction indicated by the arrow Y in Fig. 14, the mounting 176, carrying the seat 173 with it, is swung from the normal working position shown in Fig. 14 to a discharge position where the seat discharges a pipe thereon into a turning and positioning mechanism P. The position of the seat as it discharges the pipe into the mechanism P is illustrated in Fig. 31 of the drawings.

A power means b, preferably a fluid pressure actuated means (Figs. 14, 15, 16, and 33), is provided for operating the arms 190, and in the case illustrated, this means includes a cylinder 195, a piston 196 operating in cylinder 195, and a rod 197 extending from the piston 196 and connected to the arms 190 by a pivot 199. The cylinder 196 is pivotally anchored at 200. A valve 201 controls the operation of the mechanism just described, and an electrical actuating unit 202 operates valve 201.

The finishing mechanisms provided to act upon (for instance, to trim and score) the ends of the pipe while it is resting in the seat 173 are in line with each other and are mounted to reciprocate horizontally into and out of engagement with the pipe held by the seat. In the case of the finishing mechanism provided to operate upon the spigot end of the pipe (Figs. 16 and 22–24), there is a carriage 210 on guides or tracks 211 that extend parallel with the seat 173. A carrier 212 is supported by the carriage through a suitable ring bearing construction 213 through which the carrier is mounted to rotate about the axis of the pipe located on the seat 173.

A suitable power means is provided to normally rotate the carrier at a suitable speed, and in the case illustrated, this involves a fluid operated motor 214 connected to the carrier through a suitable general drive 215.

A stop 217 is carried by the carrier to rotate relative thereto on an axis coincidental with that of the carrier and of the pipe on the seat 173. The stop has a face 218 engageable with the spigot end of the pipe. A yielding means such as a spring 219 normally yieldingly holds the stop 217 in a given rotative position relative to the carrier.

Cutting or trimming blades 220 and 221 are carried by the stop 217 and project therefrom to engage and trim the corners that occur at the spigot end of the pipe. The engagement of the cutters with the pipe and the friction established between the end of the pipe and the face 218, when the end of the pipe engages the face 218, result in movement of the stop relative to the carrier against the resistance of spring 219.

A groove former, such as a roller 225 having scoring ridges or teeth 226 thereon, is supported in a radial guideway 227 in the carrier, and it is coupled to the stop 217 by an operating link 228 so that, when the stop moves relative to the carrier against the resistance of spring 219, the roller 225 moves radially inward causing the teeth 226 to engage the exterior of the pipe adjacent the end thereof. The operating link is pivoted to the stop 217 by a pivot pin 230, and projections 231 on the stop engage the link and limit movement of the stop relative to the link in the desired manner to cause the desired radial shifting of the roller. The roller is on a spindle 233 that projects from the outer end of the operating link and operates in the radial guideway 227.

The mechanism that trims and scores the bell or socket end of the pipe may be similar, generally, to that just described. In the case illustrated (Figs. 16, 18, and 19), it involves a carriage 240 supported by a guide or track 241 which is parallel with the track 211 and, therefore, parallel with the seat 173. A carrier 242 is rotatably supported from the carriage through a ring bearing 243. A stop 244 is rotatably carried by the carrier 242 and carries one or more blades 245 located and formed to trim the corners in the socket end of the pipe. A spring 246 normally yieldingly holds the stop in a given rotative position relative to the carrier 242.

A scoring member or roller 247 is arranged so that its teeth or scoring parts 248 will engage the interior of the socket when the roller is moved radially outward. The roller is carried by a spindle 249 that operates in a circumferential guideway 250 in the carrier, and an operating link 251 is pivoted to the carrier at 260 and carries the spindle 249. Projections 261 on the carrier engage the operating link 251 and limit movement of the stop relative to the link. When the stop moves relative to the carrier due to friction of the stop against the bottom of the socket, or due to the action of the cutters, the scoring roller 247 is moved radially outward so that its teeth engage and score the interior of the socket or bell on the end of the pipe. In the mechanism operating on the belled end of the pipe, as in the mechanism that operates on the spigot end of the pipe, the carriage is normally rotated as by a motor 272 operating through a suitable drive 273.

Suitable power means k, k (Figs. 16, 22, and 33) are respectively provided for shifting the carriages 210 and 240 into and out of engagement with the pipe. The carriage 210 is shown as being shifted by a cylinder and piston mechanism 235 connected to the carriage by an operating rod 236. The carriage 240 is shown as being shifted by a cylinder and piston mechanism 270. The cylinder and piston mechanism 235 and 270 are controlled by a valve 271 under control of an electrical operating unit 237. The units 210 and 270 operate simultaneously under control of the valve 271.

The turning and positioning mechanism P is located beside the finishing means L and is so located as to receive pipe that discharges by gravity or rolls from the seat 173 as this seat is moved to the discharge position, as hereinabove described. The mechanism P involves a pipe gripping means 275, and in the form illustrated, this means involves a main jaw 276 and a clamp jaw 277.

The main jaw 276 is an elongate concave element, horizontally disposed when in the pipe receiving position, and when in that position, it extends parallel with the seat 173 of the trimming means hereinabove described. The clamp jaw 277 is adapted to move or shift relative to the main jaw, and in the case illustrated, it is pivotally mounted, being carried by a pivot 278 so that it is movable between an open position such as is shown in Fig. 14, where it in no way obstructs passage of pipe into or out of the main jaw, and a closed position such as is shown in Fig. 20, where it cooperates with the main jaw to form a grip that engages a substantial distance around a pipe placed on the main jaw. The jaws 276 and 277 are preferably lined with a layer of felt, or the like, that will frictionally engage the pipe so that the pipe will not slip in the jaws. When the pipe is thus gripped, it is effectively and dependably maintained on or in engagement with the main jaw.

In the preferred construction, the clamp jaw is an elongate concave element which, like the main jaw, is shaped to conform to the exterior of the pipe, and the clamp jaw may, in practice, be substantially coextensive with the main jaw which is preferably about the length of the body of the pipe and, therefore, is about the same length as the seat 173 and the cradle 117.

A power means c is provided, as shown in Fig. 14, for operating the clamp jaw 277 and is shown as involving a cylinder 280, a piston 281 operating in the cylinder, and a rod 282 from the cylinder to the jaw 277. The rod is pivotally connected to the jaw 277 by a pivot 283, and the cylinder 280 is pivotally carried by a pivot pin 285. The power mechanism just described is under control of a valve 286 operated by an electric actuating unit 287.

In the arrangement illustrated, the operating element for the valve 286 is under control of a switch 288 operated by a pivoted trigger 289. The trigger has a part located adjacent the main jaw 276 to normally project into the path of pipe being engaged with the jaw 276 so that, as a pipe enters the jaw 276, the trigger 289 is operated, actuating switch 288 so that unit 287 is operated positioning the valve 286 so that the power means is actuated to close the clamp jaw 277. A second switch 290 is in the circuit controlling the actuating unit 287 and is so positioned as to be engaged and operated by the carrier that supports the main jaw 276, so that, when the gripping means has been moved from the horizontal position shown in Fig. 14 to a vertical position such as is indicated in Fig. 32, the circuit to the unit 287 is operated, positioning the valve 286 so that the power means opens the clamp jaw 277.

In accordance with the invention, a carrier 291 supports the pipe gripping means just described so that it is operable between a pipe receiving position, where it is horizontally disposed as shown in Figs. 14 and 20, and a pipe delivering position, where it is vertically disposed as indicated in Fig. 32. In the preferred form of the invention, the carrier 291 is fixed to the gripping means and is connected to a stationary bracket 292 by a horizontal pivot pin 293. The carrier projects from the gripping means so that it extends down from the elongate jaw mechanism at one end thereof, in fact, at the end of the jaw mechanism or gripping means which is lowermost when the gripping means is vertically disposed. A rest 294 is provided to receive and support the other, or what is the upper, end of the gripping means when it is vertically disposed, when the gripping means is in the horizontal or pipe receiving position as shown in Fig. 20.

A power means d (Figs. 14, 20, and 33) is provided for operating the carriage 291 so that the pipe gripping means is shifted between the horizontal and vertical positions, and in the case illustrated, the power means involves a cylinder 295, a piston 296 operating in the cylinder, and a rod 297 projecting from the piston and connected to the carrier 291 by pivot 298. The cylinder 295 is pivotally supported by means of a pivot pin 299. The power means just described is under control of a valve 300 operated by an electrical actuating unit 301. The operating circuit for the unit 301 is under control of a switch 302 located at the pipe gripping means adjacent the point where the jaws are pivotally connected so that this switch is operated when the gripping jaw reaches closed or pipe-gripping position, with the result that, upon the gripping means being closed, the valve 300 is positioned to put the power operating means d for the carriage 291 in operation, with the further result that the carriage is then swung to move the gripping means from the horizontal pipe receiving position to the vertical pipe discharging position.

A pipe handling means R (Fig. 21) receives the pipe in the vertical position from the mechanism P and is, in effect, a mechanism that handles a series of individual pipe-carrying pallets 310 so that they are successively moved into position to receive pipe units from the mechanism P and, when loaded, are moved out of that position for movement to and final deposit at a position where the pipe can be left to dry. In the case illustrated, the means R involves a horizontal support 312 in fixed position in line with and below the pipe gripping means of mechanism P when that means is vertically disposed. The support 312 is adapted to receive a pallet 310, and a reciprocating pusher 311 is adapted to advance the pallet to pipe receiving position and to further advance it by means of a second pallet to a conveyor 313.

The pusher 311 is supported by a guide structure 314 so that it reciprocates horizontally between a position where it is exposed to receive a pallet 310 and a position where it has moved that pallet toward the conveyor 313. The pusher 311 is adapted to be reciprocated or operated by suitable power means e shown in Fig. 21 of the drawings as involving a cylinder 315, a piston 316 operating in the cylinder 315, and a rod 317 extending from the piston 316 and connected to the pusher. The power means just described is under control of a valve 318 adapted to be operated by an electrical actuating unit 319.

The pallet conveying device is preferably a horizontally disposed conveyor or pallet receiver 313, located so that a pallet that has been positioned on the support 312 to receive a pipe from the mechanism P is pushed from the support 312 onto the conveyor 313 as a succeeding operation of the pusher 311 pushes the next pallet into position on the support 312. In the case illustrated the conveyor 313 is shown as involving a series of rollers 320 in a suitable frame 321. In practice the conveyor can be of any suitable construction and can be extended as circumstances require. Ordinarily, the conveyor is of such length and is so disposed to receive and handle pallets discharged by the machine in such manner as to enable workmen servicing the machine to receive the pallets and finally deposit them where the pipe is to be left for drying.

The control means or control system provided by the present invention interconnects the several principal means, mechanisms, or elements hereinabove described, to the end that they operate, not only in the desired timed relation, but in the desired manner, so that the machine as a whole operates rapidly, accurately, and wholly without manual operations or care from the time the original raw materials enter the machine until the finished, vertically disposed pipe units are discharged at the conveyor. In considering the invention it is significant to observe that the forming device C establishes a horizontally disposed extrusion, and the material thus extruded is maintained horizontally disposed, is worked upon, shifted, and manipulated generally while it is maintained horizontally disposed, and it is maintained in or close to a single horizontal plane and also in close proximity to the axis of the initial extrusion until it is finally moved from the horizontal position to a vertical position for final deposit on a pallet. The relationship of parts giving the machine these general characteristics makes possible high speed production or operation in the manufacture of pipe units of substantial size and bulk, since the machine as a whole is without any operations or actions which involve extended, complicated, or exceedingly rapid movements of the formed material.

An important feature or aspect of the control means that is provided by the present invention is the incorporation in the machine of two separate and distinct fluid pressure systems, one of which gives positive or solid action while the other gives a soft or cushion action. In carrying out the invention, certain of the fluid pressure actuated units or means incorporated in the machine are operated by liquid, and the action of these units is, in effect, solid or positive. Other fluid pressure actuated means or units in the machine are operated pneumatically, of the action of these parts is, in effect, soft or cushioned.

Further, in accordance with the present invention, it is generally characteristic of each of the fluid pressure actuated power means in the machine that it be under control of a valve and that the valve be actuated by an electrical operating unit, which unit is, in turn, coupled or connected in an electrical system or circuit characterized by control switches and relays, the switches being coordinated with the working or mechanical parts of the machine, to the end that the desired timed relationship between the parts is gained.

The control means or system is diagrammatically illustrated in Fig. 33, where a pump 350 is illustrated delivering liquid under pressure to a supply line 351. A liquid return line 352 is provided and delivers the liquid exhausted from the valves to a reservoir 353 from which the pump 350 is supplied. In accordance with the present invention, the power means a operating the lock mechanism 53, the power means b operating the seat mounting means 190, the power means c operating the gripping means of mechanism P, the power means d operating the carriage 291, and the power means e operating the pusher are all supplied with operating fluid under pressure by the supply line 351 and are under control of valves 79, 201, 286, 300, and 318, respectively.

An air supply line 360 is provided and is supplied with air under pressure from a tank or reservoir 361, which is shown as supplied by means of a suitable pump 362. Power means f operating clutch 27, power means g operating the rod 60, power means h operating the arms 123, the power means i operating the rocker 122, power means j operating the cradle 117, and power means k operating the trimming mechanisms are all supplied with air under pressure from the pressure supply line 360 through valves 30, 86, 155, 138, 165, and 271, respectively.

The electrical system provided by the present invention includes, not only the electrical valve actuating units hereinabove mentioned and the switches that have been mentioned, but also various additional switches and holding devices or relays and interconnections between various elements, as appears from the diagram, Fig. 33.

In the diagram, Fig. 33, electrical power carried by lines 365 acts through a master unit 366 to energize the control circuit, one pole of which is carried by a main bus line 367 while the other pole is carried by a main bus line 368. For simplicity of illustration, the various electrical elements are illustrated as coupled between the bus lines 367 and 368.

Certain of the elements of the machine, in practice, require manual control at times, and for such purpose, suitable manual switches are provided as at 575 and 576, whereas under normal operating conditions they, together with all of the other elements, are under full automatic electrical control. In the system illustrated, the electrical elements requiring occasional manual operation are normally connected with a branch bus line 367$^a$ through a selector switch 370 which can be thrown to disconnect the branch bus line 367$^a$ and to energize a branch bus line 367$^b$ supplying the switches at 575 and 576. During normal operation of the machine, the selector switch 370 is positioned as indicated in the diagram, and as a result of such setting, the control circuit to the various elements of the machine is in service.

A primary starter switch 390 controls a circuit through line 391 to the actuating element 80 of valve 79 controlling power means a that operates the lock means 53 for locking the plug 51 in engaged position with the socket 50. In the construction illustrated, the starter switch 390 is supported on a beam 376 spaced from and extending parallel with the rod 60, and a cam 377 on the rod 60 is located lengthwise of the rod and is related to the switch 390 so that the switch 390 is operated or closed to line 391 as the rod 60 reaches the position where the plug 51 engages the socket 50. The switch 390 is a double throw switch and is such as to be operated or closed to line 391 only as the cam 377 moves toward the socket 50.

A manually operated master control switch 390$^a$ is provided, ahead of and in series with the switch 390, for putting the machine into operation and for stopping it when desired. Opening of switch 390$^a$ will stop operation of the machine with the rod 60 advanced and with the plug in the socket, but not locked therein. It is to be noted that operation of the lock 53 will cause closing of a switch 371, which starts a new cycle of operation of the rod 60 and the elements of the machine related thereto, all of which will be hereinafter described.

A timer 392 is provided in the circuit controlling the lock means; for instance, it may be connected in line 391 and, in practice, is an adjustable timer. The timer operates so that, following closing of switch 390, the circuit to the operating unit 80 controlling the lock means remains energized, and the lock remains closed or engaged for a predetermined time interval, following which the timer releases, the circuit opens, and the lock means is released by reversal of operation of the power means a.

The control circuit for motor 22 is controlled by a starter switch 371. The switch 371 is located on the lock means 53 so that it is operated or closed upon the lock means 53 being engaged to lock the plug in the socket. The closing of switch 371 closes a self-energizing relay 372, which in turn closes a relay 374. Closing or energization of relay 374 through a line 373 closes a switch 380, which completes the circuit to the switch 375 in the power line 365$^a$ to motor 22.

The relay 374 includes the switch 380 governing the circuit to motor 22, and it also includes a switch 381 governing the circuit to an electrical actuator 31 operating the valve 30 of the power means f of clutch 27. As a result of this connection, when the relay 374 is energized, clutch 27 is closed.

The relay 374 further includes a switch 383 governing the circuit to the electrical actuator 16 operating valve 15, which controls the flow of water to the mixer.

As a result of the switches and connections just described, closing of the starter switch 371 causes simultaneous operation of the material feed device A, the clutch 27, and the water supply 11.

The relay 372 is shown as including a coil or winding 397 energized by the momentary closing of switch 371. The winding 397 is maintained energized through a switch 398 in the relay closed when winding 397 is initially energized. The switch 398 is in a holding circuit carried by a line 399 in which there is a stop switch 400 hereinafter described.

As the control thus far described is set into operation, as stated, the mixer is being supplied with material from the container 10, water is being supplied to the mixer, the agitators of the mixer are in operation, the initial forming means B is in operation delivering material or clay to the forming device C, and, since the plug is in the socket of the mold, the material thus delivered is filled into the cavity established by the socket and plug forming a pipe socket or bell.

The timer maintains the lock means engaged long enough so that the mold fills completely with clay, at which time the lock means 53 releases, freeing the plug from the socket.

Continued operation under the conditions above stated results in a straight tubular extrusion issuing from the forming device C, and, as this extrusion is formed or as this action continues, the belled clay formed while the plug was locked in the socket moves out of the socket and continues to advance away from the socket, pushing the plug and the rod 60 supporting the plug. This pushing of the plug and its supporting rod occurs against the resistance of air under pressure in the means g that operates the rod, the means g being such as to maintain a substantial pressure against this movement of the extrusion, with the result that the extruded clay is maintained under pressure and, therefore, straight and tubular until the desired length of extrusion has been obtained and the cutting and supporting operations have been performed, as hereinafter described.

The pressure exerted by the means g is, in effect, compression on the extrusion counteracting the action of gravity that tends to cause sagging deflection, collapse, or even, possibly, breaking off of the extrusion because of its extension beyond the point of support where it issues from the forming device C.

The operation of the rod 60 under the action of the power means g is under control of a series of switches, including switches 401, 402 and 400. These switches are double-throw switches and are operated by the cams on the rod 60, the several switches being located on the beam 376. The various switches on beam 376 are adjustable lengthwise of the beam so that accurate adjustment of the machine can be made easily and quickly.

The switch 401 is located on the beam 376 remote from the plug carrying end of rod 60, and, if it is assumed that the rod has moved to a fully retracted position, it will operate switch 401 to one position for closing a circuit through line 405 and causing energization of relay 406 by completing a circuit through the holding coil 407 of that relay. Operation of relay 406 closes switch 408 of relay 406, thus completing a circuit through line 409 to the actuating unit 88 that operates valve 86 to a position that results in operation of the means g so that the rod 60 is moved toward the socket of the mold. This operation continues, as relay 406 is held closed, until the plug 51 approaches the socket 50 but is still spaced an appreciable distance therefrom, at which time switch 402 is operated by cam 415 on the rod 60, thus opening the circuit through the holding coil 407 of relay 406 so that switch 408 is opened and the operating unit 88 is thus de-energized. The rod and the plug thereon being in motion, they will continue in motion until the plug reaches the socket 50, whereupon they stop with the plug in working engagement with the socket, and the lock means 53 operates through the control hereinabove described.

Operation of switch 371, occurring at this time, closes relay 372, and in this relay there is a switch 418 controlling a circuit normally closed by switch 390. The circuit controlled by switch 418 is carried through a line 419 which connects with line 409, with the result that a circuit is complete to the actuating unit 88 of valve 86 so that pressure is again introduced into the means g, causing the rod and the plug thereon to be held with pressure against or toward the socket 50.

The pressure thus established on the plug urging it toward the socket is maintained while the body of the pipe is extruded, after the plug has been unlocked, and as the plug in the belled end of the pipe moves away from the socket. This condition continues or prevails until the desired amount of pipe body has been extruded, at which time switch 400 is operated to release relay 372, thus opening the circuit through line 419 to the actuating unit 88 of valve 86. As the relay 372 is opened, switch 398 is opened, and as a result, the switches 380, 381, and 383 are opened, stopping operation of motor 22, the flow of water, and the operation of the mixer.

The operation of switch 400, as just described, closes the circuit through line 410 to relay 411 so that the holding coil 412 of relay 411 is energized and switch 413 of relay 411 is closed. This completes a circuit through line 414 to the operating unit 87 of valve 86, causing valve 86 to be reversed so that pressure is supplied to the means g for causing the rod to be moved away from the socket or to be retracted, which operation results in withdrawal of the plug from the bell or socket of the pipe.

The retracting movement or operation of rod 60 under the action of the means g continues until cam 377 operates switch 401, which operation causes relay 411 to be opened or dropped with consequent opening of switch 413 and, therefore, opening of the circuit through line 414 to the actuating unit 87. Simultaneous with this opening of the circuit to operating unit 87 the circuit to the operating unit 88 through the line 409 is closed through the relay 406, which operation occurs as a result of operation of switch 401. The cycle of operation of the rod 60 is thus completed, and a second cycle started.

Operation of switch 400 results in stopping of the various operations identified with that switch and in closing of the circuit through the line 410 to the relay 411 actuating relay 411, so that switch 420 in relay 411 is closed, this switch being in a circuit carried by a line 421 which connects to the motor 97 that operates the cutter J. A switch 422 is in series in the line 421 and is operated by a cam 415 after the cradle is lifted into supporting engagement with the pipe and after the rod is operated to retract the plug from the socket. Rotation of the cutter head acts to sever the formed pipe. The closing of the circuit to motor 97 causes that motor to operate in a direction to actuate the cutter so that the extruded pipe, with the socket or bell on the leading end thereof, is severed from the material or clay at the discharge end of the forming device C.

The operation of the motor 97 driving the cutter for cutting the extruded pipe body continues under power while the elongate cam 415 holds the switch 422 actuated. When this operation of the motor 97 is cut off, the cutter will continue to spin and will slow down or decrease in speed until the rod operates toward the socket, causing the plug to approach the socket, and until cam 415 on the rod operates switch 402, whereupon a circuit is closed through line 425, which line leads to the other pole of the reversible motor 97, with the result that the motor 97 operates in a direction opposite to that above described, with consequent retraction of the blade of the cutter so that the cutter is fully collapsed before the plug engages the socket and before the feeder B is again put into operation to cause material to be extruded into the mold. The timed operation of switch 402 results in the desired retraction of the cutter blade, following which the circuit through line 425 is opened, but the cutter continues to spin or revolve, maintaining the blade retracted, and it slows down or decreases in speed until the motor is energized as first described and in a manner to again cause the blade to be extended for cutting.

When the switch 400 is operated to cause stopping of operations, so that the extrusion of clay is stopped, with the desired length of pipe extruded and held under pressure by the means g acting through the rod and plug, a circuit is completed through the line 410 and through a line 430 to a relay 431, which relay is closed at this time so that switch 432 of the relay in line 430 is closed, thus completing a circuit to relay 433 so that this relay is energized, closing switch 434 thereof and completing the circuit through a line 435 to the actuating unit 139 of valve 138, causing operation of the power means i so that the rocker 122 is operated to its vertical position from its phantom outline position shown in Fig. 14. The cradle 117, carried by the rocker 122 through the arms 123, is thereby elevated and finally positioned under and in engagement with the body portion of the pipe. This action occurs before operation of switch 422 by cam 415, which causes cutting of the pipe, so that the cradle supports the pipe before it is severed from the material at the discharge end of the forming device C.

When the cutter has been operated as above described to sever the formed pipe, so that it is free, switch 445 is operated opening the circuit to relay 431 so that switch 442 of relay 431 is opened, opening a circuit through line 446 which supplies the actuating unit 156 for valve 155. This results in the valve 155 operating, as by means of a spring or the like (not shown) incorporated therein, to cause operation of means h so that the arms 123 carrying the cradle 117 are operated from the position shown in Fig. 14, where the cradle supports the pipe in line with the mold D and forming device C, to swing the pipe in the direction shown by the arrow X in Fig. 15, with consequent carriage of the pipe laterally from alignment with the mold while it is maintained in a horizontal plane, the movement being such as to move the pipe out of the path of the next pipe to be formed and out of the path of the rod and the plug carried thereby, thus clearing the mechanism for return of the plug to the socket in the manner hereinabove described.

A switch 452 is provided in line 409 from relay 406. When the cradle 117 has been moved in the manner above described to its horizontally offset position, one of the arms 123 operates the switch 452, closing the circuit through line 409 to the operating unit 88 operating valve 86 and putting means g in operation to advance the rod 60. Switch 452 is a safety switch which prevents the rod 60 from being advanced until arms 123 have shifted out of the path of the rod 60 and of the parts carried thereby. The rod cannot advance until switch 452 is operated by the arm 123.

When the cradle 117 has been moved in the manner just described to its horizontally offset position, a switch 450 is operated by being engaged by a part, such as one of the arms 123, with consequent closing of a circuit through a line 451, which results in energization of the actuating unit 166 of valve 165. This operation of valve 165 operates the means j so that the cradle is rocked or tilted to a position such as is shown in Fig. 30, which operation results in the pipe rolling or falling by gravity from the cradle 117 to the seat 173 of mechanism L.

A normally closed switch 460 is tripped and operated or opened by cam 377 on the rod 60 when the rod has been operated to a point where the plug 51 is close to or approaching the socket 50. The opening of switch 460 opens relay 433, opening the circuit to the operating unit 139 of valve 138 and resulting in a reversal of means i, whereupon the rocker 122 is returned to its phantom outline position shown in Fig. 14. Thus, as the arms 123 are operated as will be described, they swing out or away from the rocker and down, rather than horizontally, in returning to their extended positions.

Upon completion of the operating or tilting of the rocker 122 in the manner just described, a switch 470 is closed. Switch 470 controls the holding coil 440 of relay 431. Energization of relay 431 closes switch 442, completing a circuit through a line 446 to actuating unit 156 of valve 155. This causes operation of means h so that the arms 123 are operated to the extended positions after the return rocking or the tilting of the rocker 122 under the action of means i.

As the last described movement of arms 123 starts, switch 450, which had been held closed by an arm 123, is opened, with consequent opening of the circuit through line 451. This results in operation of valve 165 and actuation of means j so that the cradle is moved or returned from the rocked position to the initial position, ready to receive and support a pipe when the rocker is operated to elevate the cradle into engagement with the pipe, as shown in Fig. 14.

When the seat 173 of the pipe finishing means L receives the pipe from the cradle, it is operated or depressed, as hereinabove described, until it reaches a position supporting the pipe in alignment with the trimming mechanisms. When the seat 173 reaches this position, a switch 480 is closed by being engaged by the seat 173, closing a circuit through a relay 481 by the closing of switch 482 in the relay. The circuit closed by switch 482 is carried by a line 483, and when this circuit is energized, the actuating unit 237 is energized, operating a valve 271 with consequent operation of the two power means k of the two trimming mechanisms for movement of the trimming mechanisms into engagement with the pipe, simultaneously, at both ends of the pipe. The closing of relay 481 occurs while switch 418 of relay 372 is closed and the circuit to switch 482 of relay 481 is through line 419 from switch 418, which curcuit is at that time energized. The two power means k of the trimming mechanisms remain operated with the trimming mechanisms engaged with the pipe until switch 418 opens, as hereinabove described, whereupon the circuit through line 419, switch 482, and line 483 opens, and the operation of the two means k reverses, with consequent withdrawal of the trimming mechanisms from the pipe.

As the two means k operate for retracting the trimming mechanisms from the pipe, the carriages of the trimming mechanisms operate switches 490 and 491, which are in series in a circuit controlling a relay 492. One of these switches, namely 490, is such as to remain closed when thus operated by the carriage that engages it, while the other, namely switch 491, is a trip switch only momentarily closed when operated by the carriage that engages it. The switches 490 and 491, in series when operated, close relay 492 by energizing the holding coil 494 thereof. Operation of relay 492 closes switches 495 and 496, switch 495 being in the holding circuit to the coil 494 of relay 492. Switch 496, when closed, completes a circuit through line 497 which controls the operating unit 202 of valve 201 to cause operation of means h, with consequent operation of the transferring means and movement of the seat 173 from the position where it supports the pipe in line with the trimming mechanisms to the discharge position where the pipe rolls by gravity into the main jaw 276 of the gripper of the turning and positioning mechanism P.

Rolling of the pipe from the seat 173 results in the seat returning to the elevated position shown in Fig. 14, thus opening or releasing switch 480 that opens or drops relay 481, with consequent opening of switch 497$^a$ in relay 481, which switch 497$^a$ is in the holding circuit of relay 492. The result is that relay 492 is opened or dropped, with consequent reversal of operation of valve 201 so that the transfer means operates to return the seat 173 to the position shown in Fig. 14, readying the seat for reception of the next pipe.

Engagement of the pipe in the main jaw 276 operates switch 288 through the trigger 289 to close a circuit through line 505 to relay 506. A switch 500 in the line 505 is in series with switch 288 and is normally closed. Energization of relay 506 closes a holding circuit through a switch 507 of relay 506 and closes a switch 508 controlling a line 509 to operating unit 287 of valve 286 so that means c is operated, causing the clamp jaw 277 to be operated to the closed or pipe embracing position. This closing or operation of the clamp jaw 277 closes switch 302 in a line 510 leading to a relay 511, thus operating the relay 511 so that its holding coil 512 is energized and a switch 513 in this relay is closed, completing a circuit through line 514 to a line 515 connected with the operating unit 301 of valve 300, with consequent operation of means d so that the clamp device is rocked from the horizontal position to the vertical position. Upon reaching the vertical position, the clamp device holding the pipe operates a switch 290 opening the circuit through switch 407, with consequent operation of relay 506, so that switch 508 is opened and the clamp device is operated to cause the jaws to open for releasing or freeing the pipe.

As the clamp jaw 277 of the clamp device opens, switch 302 is operated, opening the circuit to relay 511 with consequent operation of switch 513 and operation of the means d so that the clamp device is returned to the horizontal position where it is ready to receive the next pipe. When the clamp device has been returned to position ready to receive the next pipe, switch 500 is operated, setting the mechanism ready for the next cycle of operation.

As the means d started operation as hereinabove described, resulting from operation of switch 500, the switch 500 closed a circuit through a line 520 controlling the operating unit 319 of valve 318 with consequent operation of power means e on the pipe handling means R, causing movement of the pallet 310 supporting the previously deposited pipe so that the said previously deposited pipe is shifted onto the conveyor 313 while an unoccupied pallet is moved onto the support 312 to receive the pipe in the clamp device, as the clamp device is operated to the vertical position. Return of the clamp device to the horizontal position ready to receive a pipe operates switch 500 with consequent reversal of operation of the means e and consequent return of the pusher 311 to the position shown in Fig. 21, where it is ready to receive another pallet which, on the next operation, will be pushed into pipe receiving position and will push the loaded pallet onto the conveyor.

Operation of the means c to the shifted position causes closing of switch 502 by the pusher 311. Switch 502 is in the line 510 to the relay coil 512. Operation of relay coil 512 and consequent operation of means d cannot occur when the switch 502 is open. Therefore, the turner will not operate until the pusher has operated to move a new pallet into position, which operation pushes the previously loaded pallet from the support 312 to the conveyor.

Having described only a typical preferred form of apparatus and a typical manner of carrying out the method of my invention, I do not wish to be limited or restricted to the specific details herein set forth, but wish to reserve to myself any variations or modifications that may appear to those skilled in the art and fall within the scope of the following claims.

I claim:

1. A machine of the character described including, clay molding means, means for intermittently extruding clay horizontally to the mold under pressure and in tubular form, and a support movable into and out of position to support an extrusion, the molding means including a socket, a plug, a horizontally disposed rod carrying the plug into and out of engagement with the socket, power means adapted to urge the rod toward the socket, lock means releasably securing the plug to the socket, and control means whereby the lock means is engaged only during the initial phase of forming each extrusion and whereby the power means urges the rod toward the socket following release of the lock means in order to put the extrusion in endwise compression and until the extrusion is completed to the end that the extrusion supports itself against sagging and whereby the support engages the extrusion upon its completion and while the power means urges the rod toward the socket.

2. A machine of the character described including, clay molding means, and means for intermittently extruding clay horizontally to the mold under pressure and in tubular form, and a horizontal support vertically movable into working position engaging under an extrusion and horizontally movable into a shifted position laterally offset from the working position, the molding means including, a socket, a plug, a rod carrying the plug into and out of engagement with the socket, reversible power means adapted to urge the rod toward the socket, lock means releasably securing the plug to the socket, and control means whereby the lock means is engaged only during the initial phase of forming each extrusion and whereby the power means urges the rod toward the socket following release of the lock means and until the extrusion is completed and whereby the support engages the extrusion upon its completion and while the power means urges the rod toward the socket and moves horizontally to the shifted position following reverse of the power means effecting release of the plug from the extrusion.

3. A machine of the character described including, clay molding means, and means for intermittently extruding clay horizontally to the mold under pressure and in tubular form, a horizontally disposed tiltable support, means adapted to operate the support vertically into loading position beneath a completed extrusion, means adapted to operate the support horizontally out of the loading position, and means adapted to rock the support to discharge the extrusion therefrom, the molding means including, a socket, a plug, a rod carrying the plug into and out of engagement with the socket, power means adapted to urge the rod toward the socket, lock means releasably securing the plug to the socket, and control means whereby the lock means is engaged only during the initial phase of forming each extrusion and whereby the power means urges the rod toward the socket following release of the lock means and until the extrusion is completed and whereby the means operating the support first moves the support into engagement with the extrusion while the rod is urged toward the socket, then moves the support away from the loading position and then rocks the support.

4. A machine of the character described including, clay molding means, and means for intermittently extruding clay horizontally to the mold under pressure and in tubular form, a horizontally disposed tiltable support, means carrying the support including a rocker having a horizontal axis, and parallel arms pivotally mounted on the rocker and pivotally connected with the support, means adapted to operate the rocker and move the support vertically into loading position beneath a completed extrusion, means adapted to operate the arms and move the support horizontally out of the loading position, and means adapted to rock the support to discharge the extrusion therefrom, the molding means including, a socket, a plug, a rod carrying the plug into and out of engagement with the socket, power means adapted to urge the rod toward the socket, lock means releasably securing the plug to the socket, and control means whereby the lock means is engaged only during the initial phase of forming each extrusion and whereby the power means urges the rod toward the socket following release of the lock means and until the extrusion is completed and whereby the means operating the support first moves the support into engagement with the extrusion while the rod is urged toward the socket, then moves the support away from the loading position and then rocks the support.

5. A machine of the character described including, clay molding means, means for intermittently extruding clay horizontally to the mold under pressure and in tubular form, and a support movable into and out of position to support an extrusion, the molding means including, a socket, a plug, a horizontally disposed rod carrying the plug into and out of engagement with the socket, power means adapted to urge the rod toward the socket, lock means releasably securing the plug to the socket, a cutter adapted to operate upon completion of each extrusion to sever it from the following one, and control means whereby the lock means is engaged only during the initial phase of forming each extrusion and whereby the power means urges the rod toward the socket following release of the lock means putting the extrusion in endwise compression and until the extrusion is completed to the end that the extrusion supports itself against sagging and whereby the support engages the extrusion upon its completion and while the power means urges the rod toward the socket and before it is severed by the cutter.

6. A machine for making clay pipe including, means for making clay from dry material and water, a clay feeder adapted to receive clay from said means and deliver it under pressure, a primary forming device adapted to receive clay from the feeder and deliver it in a horizontal tubular form, a bell mold including a socket stationary with said device, a plug movable into and out of cooperative engagement with the socket, a horizontally disposed rod carrying the plug, a power means adapted to urge the rod toward the socket, a common drive operating the said means and the feeder, a control means governing the drive whereby intermittent operation of the forming device delivers extrusions of clay, a support movable into and out of position where it supports an extrusion of clay, and power means operating the support, the control governing the last mentioned power means and the power means urging the rod whereby the extrusion of clay is put in endwise compression during the forming thereof to prevent sagging and whereby the support engages each extrusion of clay while it is subject to the action of the power means urging the rod toward the socket.

7. A machine for making clay pipe including, means for making clay from dry material and water, a clay feeder adapted to receive clay from said means and deliver it under pressure, a primary forming device adapted to receive clay from the feeder and deliver it in a horizontal tubular form, a bell mold including a socket stationary with said device, a plug movable into and out of cooperative engagement with the socket, a rod carrying the plug, a power means adapted to urge the rod toward the socket, a common drive operating the said means and the feeder, a control means governing the drive whereby intermittent operation of the forming device delivers extrusions of clay, a horizontally disposed tiltable support, power means adapted to operate the support vertically into loading position beneath an extrusion as it is completed, power means adapted to operate the support horizontally to an unloading position, and means adapted to tilt the support to discharge extrusions from the support, the control means coordinating the action of the power means operating the support vertically and horizontally and the means tilting the support so each extrusion is engaged by the support when the rod is urged toward the socket and the tilting of the support occurs only when the support is in the unloading position.

8. A machine of the character described including, a pipe forming mechanism delivering clay pipe units horizontally one after another, an elongate horizontally disposed pipe support, a rocker supported on a horizontal axis, a horizontal member, a pair of like parallel arms having inner ends pivoted to the rocker and outer ends pivoted to said member, means mounting the support on said member to rock about a horizontal axis parallel with the support, and power means oscillating the rocker and swinging the arms and tilting the support whereby the support engages under each pipe unit as it is completed, moves it horizontally laterally of said mechanism and then discharges it.

9. A machine of the character described including, a pipe forming mechanism delivering clay pipe units horizontally one after another, an elongate horizontally disposed pipe support, a rocker supported on a horizontal axis, a horizontal member, a pair of like parallel arms having inner ends pivoted to the rocker and outer ends pivoted to said member, means mounting the support on said member to rock about a horizontal axis parallel with the support, power means oscillating the rocker and swinging the arms and tilting the support whereby the support engages under pipe units when they are completed and moves them horizontally laterally of said mechanism and then discharges them, and control means whereby said power means is coordinated with the delivery of pipe units by the said mechanism.

10. A machine for making clay pipe including, means for making clay from dry material and water, a clay feeder adapted to receive clay from said means and deliver it under pressure, a primary forming device adapted to receive clay from the feeder and deliver it in a horizontal tubular form, a bell mold including a socket stationary with said device, a plug movable into and out of cooperative engagement with the socket, a rod carrying the plug, a power means adapted to urge the rod toward the socket, a common drive operating the said means and the feeder, a control means governing the drive whereby intermittent operation of the forming device delivers extrusions of clay, a horizontally disposed tiltable support, power means adapted to operate the support vertically into loading position beneath an extrusion as it is completed, power means adapted to operate the support horizontally to an unloading position, and means adapted to tilt the support to discharge extrusions from the support, the control means coordinating the action of the power means operating the support vertically and horizontally and the means tilting the support so each extrusion is engaged by the support when the rod is urged toward the socket and the tilting of the support occurs only when the support is in the unloading position, the control means including an electric circuit with switch means operated from the rod.

11. A machine for making clay pipe including, means for making clay from dry material and water, a clay feeder adapted to receive clay from said means and deliver it under pressure, a primary forming device adapted to receive clay from the feeder and deliver it in a tubular extrusion, a bell mold including a socket stationary with said device and a plug movable into and out of cooperative engagement with the socket, a common drive operating the said means and the feeder, a reversible rotating cutter located to cut material where it is delivered by the forming device and including a blade extended to cut when the cutter rotates in one direction and retracted from cutting position when the cutter rotates in the opposite direction, and control means governing the drive for intermittent operation and putting the cutter in operation in the first mentioned direction when the forming device is out of operation and putting the cutter in operation in the reverse direction when the forming device is in operation.

12. A machine of the character described including, a mold and means adapted to supply clay to the mold in tubular form, the mold including a socket into the bottom of which the clay is introduced, a plug forming a mold core, a power operated rod carrying the plug and adapted to move it into and out of cooperative engagement with the socket, a mounting supporting the rod for reciprocation to and from the socket, and control means coordinating operation of the mold and the means supplying clay including, an electric circuit, a beam spaced from and parallel with the rod, switches in the circuit and mounted on the beam to be adjacent the rod, and members on the rod operating the switches, the switches being adjustable lengthwise of the beam.

13. In a machine of the character described, a mold mechanism including, a socket adapted to receive clay at the bottom thereof, a plug engageable with the socket to define a clay receiving cavity, and lock means securing the plug to the socket including, a hook on the socket, a projection on the plug, a block slidable on the socket and having an opening receiving the projection, and fluid pressure actuated means on the socket operating the block to move the projection into and out of engagement with the hook.

14. In a machine of the character described, a mechanism adapted to receive clay and to deliver it in the form of pipe units and adapted to deliver the pipe units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby.

15. In a machine of the character described, a mechanism adapted to receive clay and to deliver it in the form of pipe units and adapted to deliver the pipe units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat adapted to receive pipe units one at a time from said means and trimming mechanisms adapted to engage and act upon the ends of a pipe unit on the seat.

16. In a machine of the character described, a mechanism adapted to receive clay and to deliver it in the form of pipe units and adapted to deliver the pipe units horizontally one after another, a pipe trimmer adapted to receive pipe units in horizontal position and located to one side of said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, said means including a cradle, means adapted to operate the cradle vertically into engagement with a pipe unit and means adapted to operate the cradle when supporting a pipe unit horizontally to a position where the trimmer receives the pipe unit.

17. In a machine of the character described a mechanism adapted to receive clay and deliver it in the form of pipe units and adapted to deliver the units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat adapted to receive pipe units one at a time from said means and trimming mechanisms adapted to engage and act upon the ends of a pipe unit on the seat, and said means including a cradle, means adapted to operate the cradle vertically into engagement with a pipe unit and means adapted to operate the cradle when supporting a pipe unit horizontally to a position where the trimmer receives the pipe unit.

18. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, and control means whereby the clay handling mechanism operates intermittently and is out of operation following formation of each pipe unit, and whereby the means transferring the pipe units and said member coordinate so the means transferring the pipe units engages them while they are under compression and while the clay handling mechanism is out of operation.

19. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, and control means whereby the clay handling mechanism operates intermittently and is out of operation following formation of each pipe unit, and whereby the means transferring the pipe units and said member coordinate so the means transferring the pipe units engages them while they are under compression and while the clay handling mechanism is out of operation, the control means including an electrical circuit with electrical actuating units and control switches controlled initially from the clay handling mechanism.

20. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat adapted to receive pipe units one at a time from said means and trimming mechanisms adapted to engage and act upon the ends of a pipe unit on the seat, and said means including a cradle, means adapted to operate the cradle vertically into engagement with a pipe unit and means adapted to operate the cradle when supporting a pipe unit horizontally to a position where the trimmer receives the pipe unit, and control means whereby the clay handling mechanism operates intermittently and is out of operation following formation of each pipe unit, and whereby the means transferring the pipe units and said member coordinate so the means transferring the pipe units engages them while they are under compression and while the clay handling mechanism is out of operation.

21. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat in which a pipe unit rests in a predetermined position, and reciprocating trimming mechanisms simultaneously engaging the ends of a pipe unit on the seat.

22. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat in which a pipe unit rests in a predetermined position, and reciprocating trimming mechanisms simultaneously engaging the ends of a pipe unit on the seat, each trimming mechanism having a constantly operating member engaging the pipe and carrying blades that engage the pipe, and a scoring device operated into engagement with the pipe when the pipe is engaged by said member.

23. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat in which a pipe unit rests in a predetermined position, and reciprocating trimming mechanisms simultaneously engaging the ends of a pipe unit on the seat, the seat being mounted to shift and being depressed when supporting a pipe unit, and control means including units controlling the trimming mechanisms and a control circuit having a switch operated by shifting of the seat.

24. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat normally disposed to receive a pipe unit from the means transferring the pipe units, and a mounting supporting the seat and operating it while carrying a pipe unit to a position where the pipe unit is discharged therefrom by gravity.

25. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, and means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat normally disposed to receive a pipe unit from the means transferring the pipe units, and a mounting pivotally supporting the seat, and fluid pressure actuated means operating the mounting to swing the seat to a position where the pipe unit rolls therefrom.

26. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat adapted to receive pipe units one at a time from said means and trimming mechanisms adapted to engage and act upon the ends of a pipe unit on the seat, and a control system governing operation of the trimmer and responsive to action of the clay handling mechanism.

27. In a machine of the character described, a mechanism adapted to receive clay and deliver it in the form of pipe units and adapted to deliver the units horizontally one after another, a pipe trimmer adapted to receive pipe units in horizontal position and located to one side of the said mechanism, means between the trimmer and said mechanism engaging the pipe units as they are formed and transferring them from the said mechanism to the trimmer, the mechanism including a member engaged with each pipe unit as it is formed and maintaining it under endwise compression until it is engaged by said means to be supported thereby, the trimmer including, a seat adapted to receive pipe units one at a time from said means and trimming mechanisms adapted to engage and act upon the ends of a pipe unit on the seat, and a control system responsive to operation of the clay handling mechanism and including means controlling operation of the trimmer and means controlling operation of the means transferring pipe units to the trimmer.

28. A machine of the character described including, a clay handling mechanism delivering pipe horizontally, a pipe trimming means trimming pipe at its ends while supporting it horizontally, a transfer mechanism receiving pipe while it is supported by said clay handling mechanism and supporting and conveying it horizontally to the trimming means, a pipe turner receiving trimmed pipe from the trimming means and holding it while turning it from a horizontal to a vertical position, and control means by which the clay handling mechanism is governed to operate intermittently and the trimming means and transfer means are operated synchronously and in synchronism with the clay handling mechanism, the turner including, a pipe gripping means, a pivoted mounting carrying the gripping means and a control system initiated by deposit of pipe in the gripping means and coordinating the action of the gripping means and that of the mounting.

29. A machine of the character described including, a clay handling mechanism for forming and delivering belled pipe of wet clay horizontally and axially onto a support, a pipe trimming means located transversely to one side of the axis of the delivered pipe for trimming pipe at its ends while supporting it horizontally, a transfer mechanism for receiving pipe while it is supported by said clay handling mechanism and for supporting and conveying it horizontally and transversely to the trimming means, a pipe turner disposed for receiving trimmed belled pipe horizontally and transversely from the trimming means and having a gripping means for substantially surrounding and gripping it while turning it from a horizontal to a vertical position, and in a direction transversely to its path of travel to the turner and so as to position the belled end of the pipe uppermost, and a reciprocating pallet operator for positioning a pallet to receive the pipe in said vertical position from the turner and operating the turner horizontally out of that position with the pipe thereon.

30. A machine of the character described including a clay handling mechanism delivering pipe horizontally, a pipe trimming means trimming pipe at its ends while supporting it horizontally, a transfer mechanism receiving pipe while it is supported by said clay handling mechanism and supporting and conveying it horizontally to the trimming means, a pipe turner receiving trimmed pipe from the trimming means and holding it while turning it from a horizontal to a vertical position, control means by which the clay handling mechanism is governed to operate intermittently and the trimming means and transfer means are operated synchronously and in synchronism with the clay handling mechanism, the turner including a pipe gripping means, and a pivoted mounting carrying the gripping means, a reciprocating pallet operator positioning a pallet to receive the pipe in vertical position from the turner and operating it horizontally out of that position with the pipe thereon, and a control system initiated by positioning a pipe in the gripping means and coordinating the operation of the gripping means, the mounting, and the pallet operator.

31. A machine of the character described including a mold, clay handling means operable for intermittently extruding clay horizontally to and through the mold in tubular form, the mold having a configuration to produce a bell shape on the leading end of each tubular clay extrusion, support means, including a shiftable supporting member disposed below the path of the clay extrusion, operable to move the supporting member from an inoperative position spaced from the path of the clay extrusion into supporting engagement with each clay extrusion adjacent the mold, and power means, including a control, for synchronously operating said molding means and said support means to operate the molding means while the supporting member is in its inoperative position until the belled end of the extrusion has moved beyond the supporting member and then to move the latter into supporting engagement with each clay extrusion rearwardly of the belled end thereof after the belled end thereof has passed the supporting member, whereby the clay extrusion may be rolled on the tubular portion thereof rearwardly of the belled leading end thereof to shift the same transversely out of the path of clay extrusion.

32. A machine as set forth in claim 31 including a powered cutter associated with the mold for cutting each clay extrusion to length, said control including means for actuating said cutter synchronously with said molding means and support means to cut each clay extrusion to length while supportingly engaged by the support means, and while the molding means is idle, powered shifting mechanism associated with the support means for shifting each clay extrusion supported thereby transversely with respect to the path of clay extrusion with a rolling motion to a trimming location, and said control including components for actuating said shifting mechanism synchronously with said molding means and said cutter for so shifting each extrusion between each operation of the cutter and the succeeding operation of the molding means.

33. A machine of the character described comprising powered means, including a mold and a cutter, for intermittently extruding clay horizontally from the mold in the form of lengths of tubular pipe having a bell shape on the leading end thereof and serving the lengths when formed, a powered support for engaging each length of pipe rearwardly of the belled end thereof and supporting the same horizontally in the path of clay extrusion before and while it is severed, whereby each severed length of pipe may be shifted transversely with a rolling motion to succeeding stations, a support at each succeeding station for engaging each length of pipe rearwardly of the belled end thereof and supporting the same horizontally while it is moved onto the support, powered shifting mechanisms associated with said supports for so shifting each length of pipe successively from support to support, a powered turning mechanism and conveyor associated with the last of said stations for gripping and lifting each length of pipe in sequence, turning the same to dispose its axis vertical, and deposit the same with the belled end thereof up and the lower end thereof resting on the conveyor, and a control for synchronously operating the extruding and severing means, the powered support, and the powered shifting means to successively receive and support the extruded lengths of pipe in the path of the extrusion and then shift them transversely from support to support one after another in spaced relationship, said control including components for operating the powered turning mechanism and conveyor synchronously with the arrival of extruded lengths of pipe at the last of said stations.

34. A machine of the character described comprising means, including a mold, for intermittently extruding clay horizontally in tubular form from the open end of the mold, horizontally retractable means for yieldingly engaging and applying endwise pressure against the forward end of the tubular form during its extrusion for holding it under longitudinal compression to maintain its axial alignment, support means movable transversely into engagement with the tubular form projecting from the mold in supporting relation thereto, and means controlling movement of the support means and retraction of the retractable means synchronously with the extruding means to automatically move the support means into its supporting position while the extruded form is still engaged by said retractable means and to automatically move said retractable means out of engagement with the extruded form after its engagement with the support means to leave the extruded form supported by the support means.

References Cited in the file of this patent

UNITED STATES PATENTS

| | | |
|---|---|---|
| 251,376 | Nolan | Dec. 27, 1881 |
| 300,909 | Smith | June 24, 1884 |
| 729,431 | Sherry | May 26, 1903 |
| 1,565,739 | Haney | Dec. 15, 1925 |
| 1,572,028 | Mueller | Feb. 9, 1926 |
| 1,610,721 | Penberton | Dec. 14, 1926 |
| 1,651,203 | Hibbins | Nov. 29, 1927 |
| 1,778,003 | Tuerck | Oct. 7, 1930 |
| 2,001,316 | Shipley | May 14, 1935 |
| 2,163,118 | Fejmert | June 20, 1939 |
| 2,235,291 | Gaertner | Mar. 18, 1941 |
| 2,541,570 | Booth | Feb. 13, 1951 |
| 2,591,267 | Lacy et al. | Apr. 1, 1952 |

FOREIGN PATENTS

| | | |
|---|---|---|
| 615,752 | Great Britain | Jan. 11, 1949 |